US006078808A

United States Patent [19]

Fukutomi et al.

[11] Patent Number: 6,078,808

[45] Date of Patent: Jun. 20, 2000

[54] RADIO DATA COMMUNICATION METHOD

[75] Inventors: Hiroshi Fukutomi, Osaka; Yu Matsumoto, Soraku-gun; Yusuke Miyata, Yamatokoriyama, all of Japan

[73] Assignee: Sharp Kabushiki Kaisha, Osaka, Japan

[21] Appl. No.: 08/878,977

[22] Filed: Jun. 19, 1997

[30] Foreign Application Priority Data

Jun. 19, 1996 [JP] Japan .................................... 8-158165

[51] Int. Cl.[7] ........................................................ H04Q 7/20

[52] U.S. Cl. ...................... 455/412; 455/566; 340/825.44

[58] Field of Search .................................... 455/412, 38.1, 455/31.3, 517, 93, 142, 566, 186.1, 418, 414, 70, 72, 422, 556, 557; 340/825.44

[56] References Cited

U.S. PATENT DOCUMENTS

| | | | |
|---|---|---|---|
| 4,940,975 | 7/1990 | Ide et al. | 340/825.44 |
| 5,128,981 | 7/1992 | Tsukamoto et al. | 455/567 |
| 5,173,688 | 12/1992 | DeLuca et al. | 340/825.44 |
| 5,297,247 | 3/1994 | Kan | 395/151 |
| 5,465,401 | 11/1995 | Thompson | 455/420 |
| 5,631,946 | 5/1997 | Campana, Jr. et al. | 455/412 |
| 5,708,781 | 1/1998 | Chiashi et al. | 340/825.44 |
| 5,784,000 | 7/1998 | Sato | 340/825.44 |
| 5,809,415 | 9/1998 | Rossmann | 455/422 |
| 5,842,123 | 11/1998 | Hamamoto et al. | 455/412 |
| 5,850,594 | 12/1998 | Cannon et al. | 455/31.3 |
| 5,870,682 | 2/1999 | Miwa et al. | 455/466 |
| 5,872,926 | 2/1999 | Levac et al. | 395/200.36 |

FOREIGN PATENT DOCUMENTS

| | | |
|---|---|---|
| WO 95/15545 | 6/1995 | Denmark . |
| 0 519 838 A1 | 12/1992 | France . |
| 2-280 185 | 11/1990 | Japan . |
| WO 89/10610 | 11/1989 | WIPO . |

*Primary Examiner*—Reinhard J. Eisenzopf
*Assistant Examiner*—Duc Nguyen
*Attorney, Agent, or Firm*—David G. Conlin; Richard E. Gamache

[57] ABSTRACT

According to a conventional pager generally avalable, mere characters and symbols can be transmitted and received. In addition thereto, since code sets that can be transmitted and received are limited, data other than messages can not be transmitted and received. However, information management section of the present invention, when transmitting and receiving of data, such as schedule data, including codes other than the code sets, the data should be converted into data in a form of message before carrying out the tranmitting and receiving. Therefore, it is possible to transmit and receive a variety of data prepared in a form other than in a form of message. When transmitting of data, only the part that has been changed is transmitted while the information management section of the addressee changes only the part corresponding to the data that has been changed, i.e., the unchanged parts of the file are not changed. Therefore, it is possible to update data with remarkably little communication amount. The information management section of the addressee displays the changed part in a manner so as to be discriminated from other unchanged part. Accordingly, the user can identify the changed part.

27 Claims, 49 Drawing Sheets

EXAMPLE .SCHEDULE DATA

RADIO DATA COMMUNICATION METHOD

FIELD OF THE INVENTION

The present invention relates to information management processing for managing information such as schedule data and an address book and relates to communication processing for radio-transmitting and radio-receiving of data.

BACKGROUND OF THE INVENTION

Among pagers for carrying out radio communication of information, there are a numeric pager and an alphanumeric pager. The numeric pager can deal with the number only, while the alphanumeric pager can deal with alphabet, Japanese katakanas, and the number. In either case, the usage is limited to the case where the accessing is carried out to a designated person who is in a unspecified area or to the case where some messages are transmitted to a disignated person. In other words, the trasmissible information is limited to the alphabet, Japanese katakanas, and the number. Accordingly, the conventional pager has been used only for transmitting messages, i.e., the conventional pager has not been used for other usage.

When a portable information terminal such as an electronic notebook is connected with a peripheral device such as modems, the user can obtain at any time the latest information or necessary information by accessing on-line services or data base through public network from outside. However, according to the portable information terminal, the user can not know whether or not some changes such as updating is carried out with respect to a file unless the user itself checks it. The user itself must access and check the data base by use of the portable information terminal, when the user wishes to know (1) whether or not the updating is carried out with respect to the file and (2) whether or not the user's data currently available is the latest one. Namely, in order to obtain the latest information, it was necessary for the user itself (1) to frequently access the data base so as to check whether or not the file is updated, (2) to check which information is the latest one, and thereafter (3) to receive such information.

When the file has been changed and the data base has the latest file, even in the case where the number of changes in the file is not many, the user must receive the entire file. Accordingly, the communication time and the cost of the communication have been wastefully consumed. In the case of the updating, the user can not verify which part of the data has been updated.

According to the technique disclosed in Japanese unexamined patent publication No. 2-280185/1990, a time table of a portable device is periodically updated by use of the radio electric wave or the telephone line. However, according to the technique, the radio electric wave or the telephone line is used as broadcasting means, not as communication means. More concretely, a predetermined service organization delivers the time table data by use of an exclusive radio electric wave or an exclusive telephone line. When the portable device receives the data through the exclusive radio electric wave or exclusive telephone line, the portable device judges that the data thus received is the data relating to the time table, thereafter selects the necessary time table data relating to a target station from the received data and stores it. According to the technique, (1) the data to be delivered is limited to the data having a specific form, i.e., a time table data and (2) the direction of the delivery is limited to the portable device from the service organization.

SUMMARY OF THE INVENTION

It is an object of the present invention to provide a radio data communication method wherein (1) a conventional pager system is usede as it is, (2) files/data (such as time table) that are prepared in arbitrary forms and are not limited to data prepared in a predetermined form can be shared in a group, and (3) updating of data can be made with each other.

In order to achieve the foregoing object, the radio data communication method of the present invention for radio-transmitting of data in a form of message to portable terminals, the portable terminals having memory means for storing a file having a data structure that is different from that in the form of message, said method is provided with the steps of:

(a) converting the file into message data in the form of message;

(b) radio-transmitting the message data; and (c) carrying out reverse-conversion by preparing a file having the data structure in accordance with received message data and storing the file in the memory means.

According to the radio data communication method, a file having a data structure that is different from that in the form of message (for example, a file having codes that can not be transmitted in the form of message) is converted into the form of message, and then is transmitted. The ways of (a) and (c) are not specifically limited, provided that message data can be prepared in accordance with a file or vice versa and there is a predetermined routine between the addresser and the addressee. As a result, by use of a conventional communication system such as a conventional pager system that can transmitt and receive only data in the form of message, it is possible to transmitt and receive a file that is different from the file prepared in the form of message. Accordingly, it is possible to realize a communication system for transmitting and receiving the file more easily than the case where a new communication system is established.

In the radio data communication method, it is preferable that the message data includes specific data indicative of message data. According to such a method, even when conventional portable terminals that can not transmit and receive the message data and portable terminals that can transmit and receive the message data are mixed, the present portable terminals can identify the message data with accuracy. Accordingly, for example, identification codes and frequencies can be commonly used (1) for the case where the data in the conventional form of message is transmitted and received and (2) for the case where the message data is transmitted and received, and thus in both cases the radio-transmitting and radio-receiving can be made in the same manner.

When the memory means can store plural kinds of files that have different data structures with each other, it is preferable that the message data includes mode data specifying that the message data should be converted into a file having a specific data structure among the data structures. In such a case, even when transmitting and receiving of plural kinds of files, the radio-transmitting and radio-receiving can be made in the same manner.

When one part of the file is changed, it is more preferable that in the step (a), the file is converted into updating data that is message data indicative of a part that has been changed and content how the part has been changed, and in the step (c), the part, of the file stored in the memory means, that corresponds to the changed part is updated in accordance with the updating data. In such a case, it is possible to transmit by converting only the part that has been changed into the form of message, thereby resulting in that the information amount to be transmitted is reduced and the time required for updating information by use of radio data communication is shortened.

When receiving updating data, it is preferable that the radio data communication method is further provided with the step of displaying the changed part of the updated file in the form of display that is different from other part that has not changed. In such a case, the user can identify which part of the file has been changed with ease.

When receiving a plurality of updating data, it is more preferable that the step (c) includes the step of selecting a updating data used during updating among the received updating data. In such a case, it is possible to update only a file that the user really wishes to update. Accordingly, even when it is not possible to update all the files at a time due to the fact that there is no vacant area on the side of the addressee, it is possible to update only necessary files without causing any problems.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

DESCRIPTION OF THE EMBODIMENTS

Figure 1:
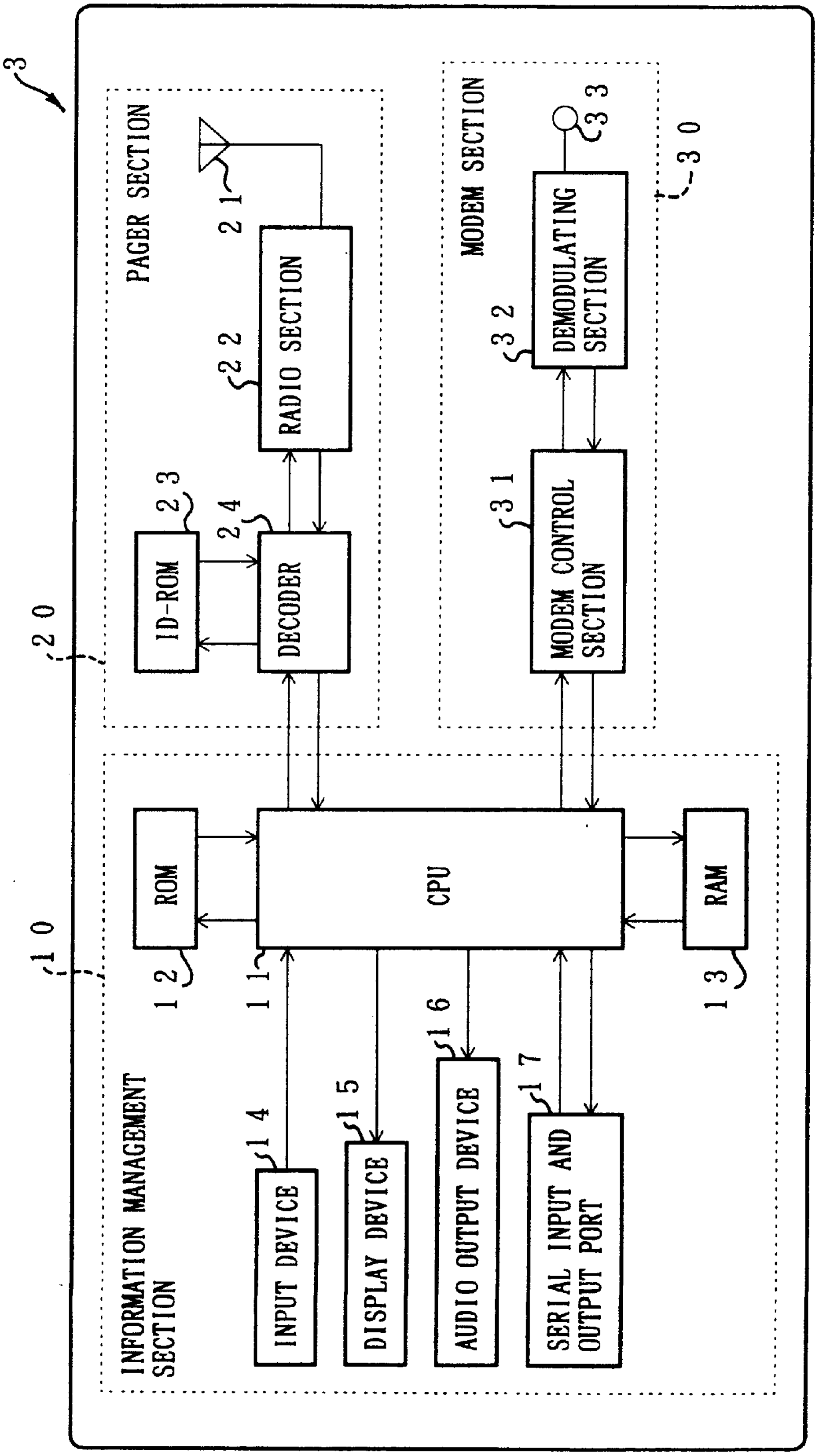
FIG. 1 is a block diagram showing a hardware structure of one embodiment of the present invention.
Figure 2:
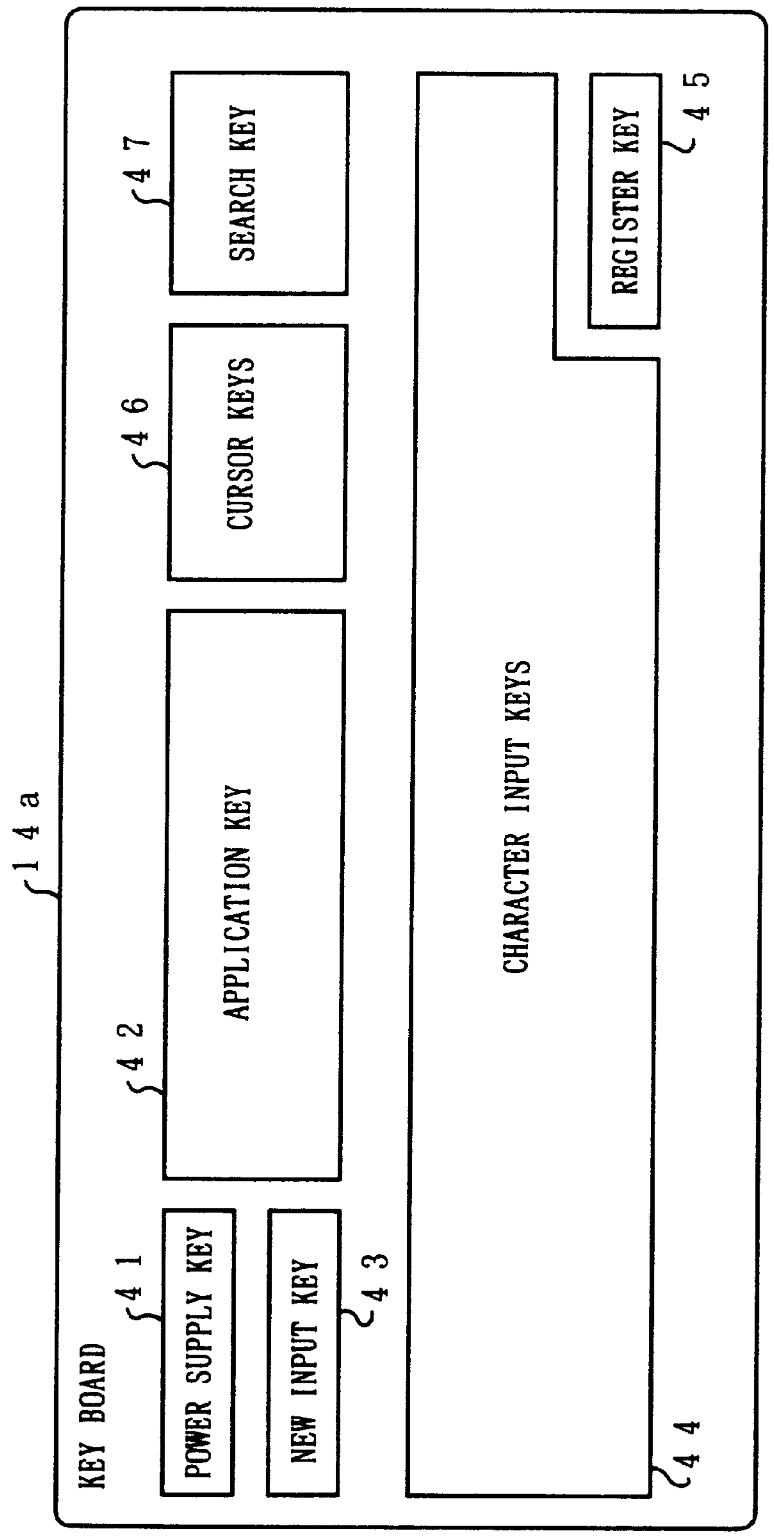
FIG. 2 is a block diagram showing an input device of the present embodiment.

The following description-deals with one embodiment of the present invention with reference to FIGS. 1 through 14. A pager system in accordance with the present embodiment is provided for radio-transmitting to a target portable station messages that include only predetermined code sets such as alphabet, Japanese katakanas, and the number. The pager system is composed of an addresser 1, a radio basic station 2, and a plurality of portable stations 3. More concretely, each identification number, which is different from those of the other portable stations 3, is preliminarily assigned to each portable station 3. The addresser 1 transmits the data in the form of message (hereinafter referred to as the message data) to the radio basic station 2 through a public telephone network. The message data includes an identification number (address) specifying a target portable station 3 and a message that the user wishes to transmit. The radio basic station 2 radio-transmits to the portable station 3. Each portable station 3 waits for the message data from the radio basic station 2. When the identification number of the message data that has been received is coincident with the identification number (hereinafter referred to as self identification number) assigned to the portable station 3, the portable station 3 judges that the message is designated to the portable station 3, thereafter starts to receive the message data from the radio basic station 2.

Note that the pager system of the present embodiment is "Alpha Numeric Pager System", and its code sets include codes indicative of alphabet, Japanese katakanas, and the number. Since the code sets are preliminarily determined, it is necessary to make all the portable stations 3 to correspond to new code sets, when changing the exsisting code sets to the new code sets.

FIG. 1 shows a hardware structure of the portable station 3 of the present embodiment. The portable station 3 is mainly three (3) units, i.e., an information management section 10 for inputting and outputting of data and registering and managing of data, a pager section 20 for receiving the message that has been radio-transmitted from the pager, and a modem section 30 for transmitting the message from the pager through the public network.

The information management section 10, the pager section 20, and the modem section 30 may be summarized in a single unit. Alternatively, they may be provided in separate units by, for example, realizing the pager section 20 as an IC card which is loaded to the information management section 10 and by realizing the modem section 30 as an attachable-type that is connected with an extended slot of the information management section 10.

The information management section 10 is provided with (1) a CPU 11 for transmitting and receiving of data to and from the pager section 20 and the modem section 30 and for controlling the entire information management section 10, (2) an ROM 12 for storing programs for the CPU 11, an RAM 13 as a memory device for registering (storing) information that has been inputted, (3) an input device 14 for inputting information, (4) a display device 15 such as liquid crystal display for informing the user of information, (5) an audio output device 16 for outputting alarms and sounds, and (6) a serial input and output port 17 for connecting other device such as a network or a printer for interface purpose.

The display device 15, as later described, can display in a predetermined area a series of characters and bit images that have been read out from the ROM 12 or RAM 13 in accordance with the instructions of the CPU 11. The display device 15 can emphasize a series of characters by adding a predetermined attribute, such as underline or italics, to the series of characters.

On the displaying screen of the display device 15, a transparent touch panel (not shown) is provided as one of the input devices 14. The touch panel can transmits to the CPU 11 information such as information whether or not the touch panel has touched and where the touch panel has touched. For example, when selecting one of a plurality of messages, the CPU 11 controls the display device 15 so as to display the messages and urges the user to select one of them. When the user touches the touch panel to select one of them, the CPU 11 judges which message is selected in accordance with the information from the touch panel and the displaying content of the display device 15. Thus, the CPU 11 can appropriately identify the inputting that is in accordance with the displaying screen of the display device 15. Note that, for convenience, hereinafter referred to the touching on the area where a button is displayed among the area of the touch panel as the pressing button.

The information management section 10 of the present embodiment is provided with a key board **14*a* as shown in FIG. as one of the input divices 14. The key board 14*a* is always used during common inputting such as the turning ON/OFF of the power supply and inputting of characters. The key board 14*a* of the present embodiment is provided with a power supply key 41 for turning ON/OFF of the information management section 10, application keys 42 for switching of the applications, a new input key 43 for inputting of new data, character input keys 44 for inputting of characters and number, a register key 45 for registering the inputted data, cursor keys 46 for moving of the cursors and for selecting data during displaying of a list, search keys 47** for addressing of the registered data.

The pager section 20 is provided with an anttena 21 for receiving the identification number and messages that have been transmitted from the radio basic station 2, a radio section 22 for amplifying/modulating of signals from the anttena 21 to obtain a digital signal, an ID-ROM 23 for storing the self identification number assigned to the present pager section 20, a decoder 24 for (1) checking whether or not the identification number of the signal from the radio section 22 is coincident with the self identification number stored in the ID-ROM 23, (2) for keeping to receive the signal from the radio section 22 when it is checked that they are coincident with each other, (3) for outputting addressing detection signal with respect to the CPU 11 of the information management section 10, and (4) for transmitting and receiving of information in accordance with the instructions from the CPU 11.

The modem section 30 is provided with (1) a modem control section 31 for controlling the modem section 30 in accordance with the instructions from the CPU 11 of the information management section 10, (2) a signal modulating and demodulating section 32 for modulating the data into an analog signal usable in the public network during transmitting of information and for demodulating the signal transmitted through the public network into a digital signal usable in the information management section 10, and (3) a telephone port 33 for connecting with the public network.

The following description deals with the concrete functions of the present invention. The following description deals with the case where a file is communicated between the same kind of information management sections 10. It is needless to say that the similar file communication can be carried out between the information management sections 10 and a computer by adopting the software for converting the format of a file into the format of the information management section 10.

Figure 3:
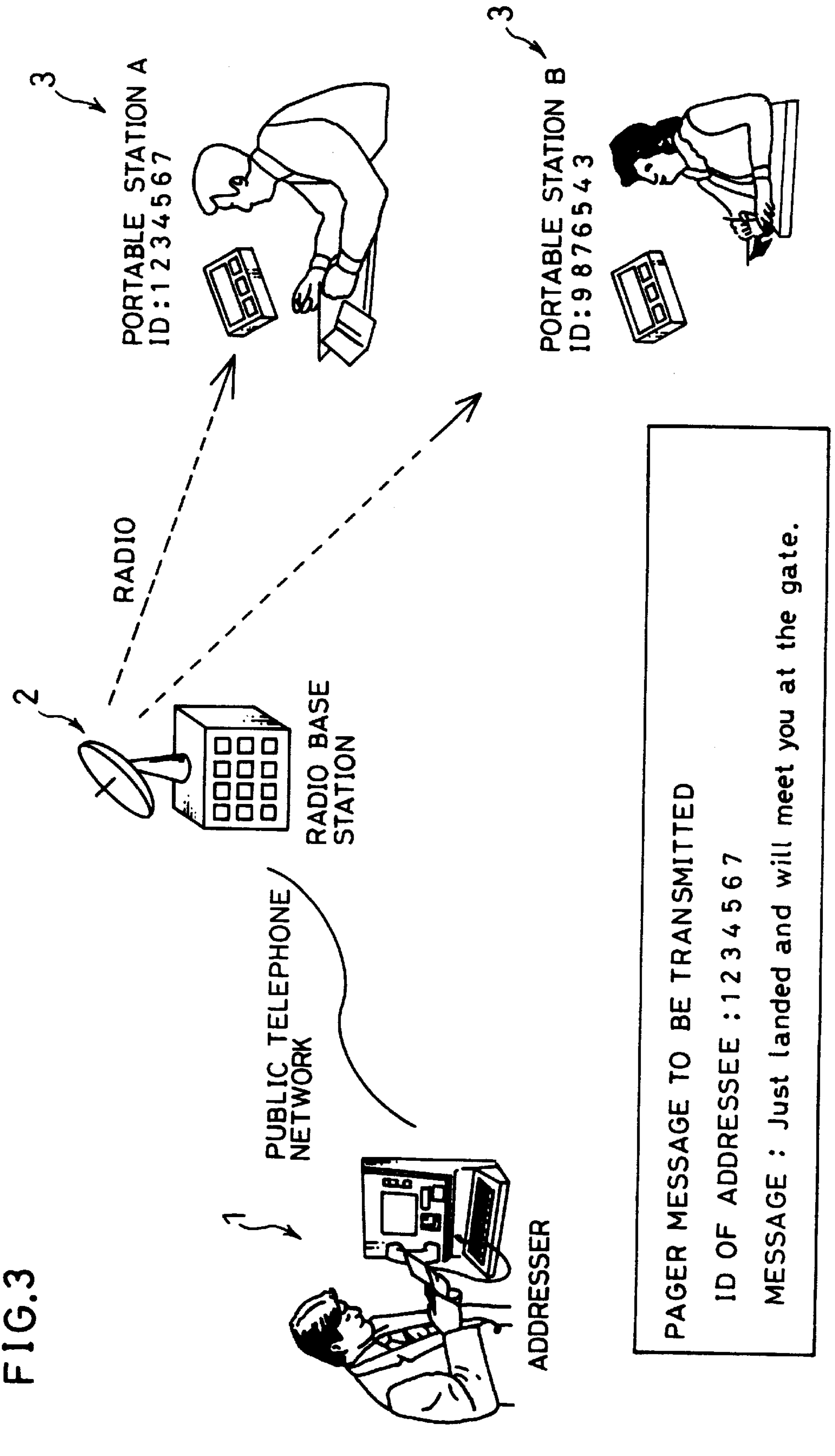
FIG. 3 is an explanatory view showing the concept of a pager system.

As shown in FIG. 3, when the radio basic station 2 transmits the message data to each portable station 3 (addressee), each portable stations 3 compares the identification number received from the radio basic station 2 with the self identification number stored in the ID-ROM 23. When these identification numbers are coincident with each other, the portable stations 3 judges that the message data is directed to itself, thereafter starts to receive the message data.

In the system as shown in FIG. 1, when the decoder 24 detects the message data directing to the decoder 24 itself, a detection signal is sent to the CPU 11. The CPU 11 instructs the decoder 24 to receive the message data in accordance with the detection signal, and stores the message of the received message data in the RAM 13. Thereafter, the CPU 11 controls the audio output device 16 to output an alarm in a predetermined manner or controls the display device 15 to light a received mark, thereby informing the user that the message has been received.

Pager message function, that is an application software for preparing the message directing to other pager and for making use of the message of the pager that has been directed to the present pager itself, is operable by turning ON the units of the information management section 10 through the power supply key 41 and thereafter selecting the pager message function through application keys 49.

Figure 4:
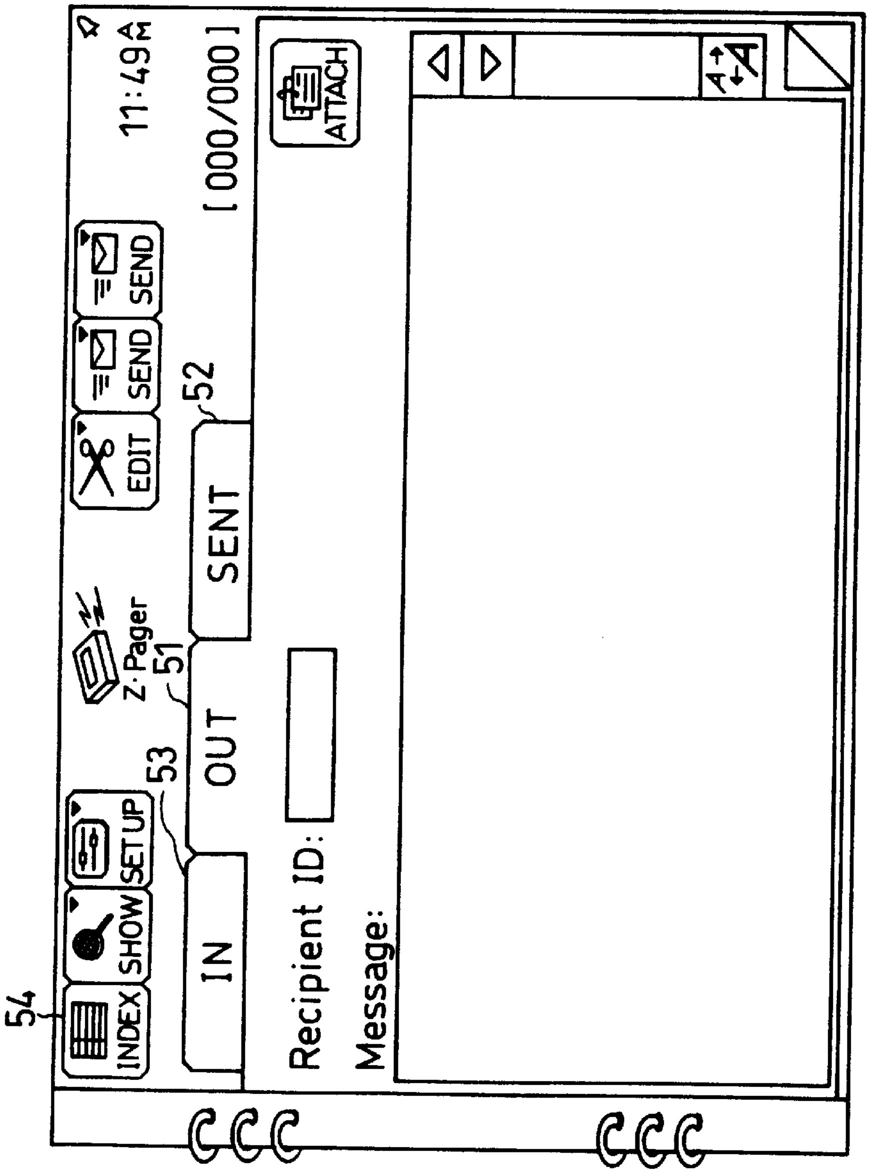
FIGS. 4(*a*) and 4(*b*) are explanatory views showing screen displaying examples relating to message function of the pager.
Figure 4B:
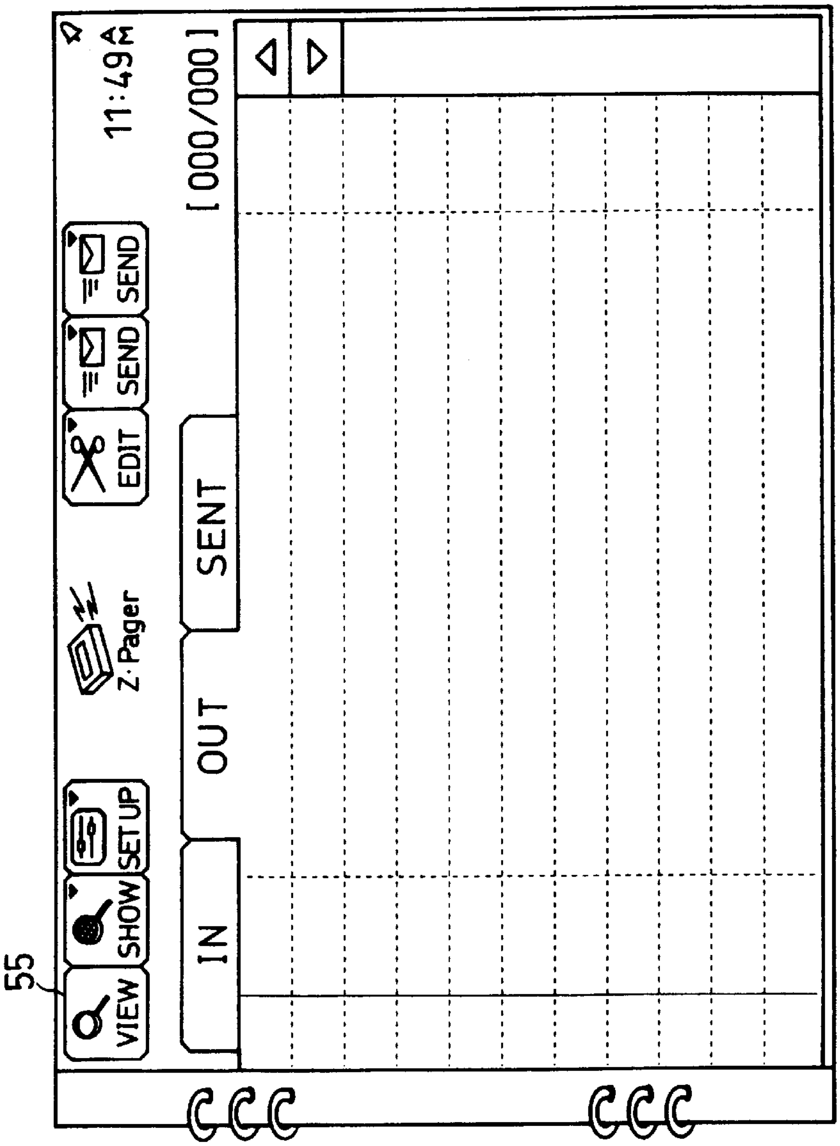

The pager message function includes, as shown in FIG. 4(*a*), an OUT folder 51, a SENT folder 52, and an IN folder 53. The new messages to be transmitted that have been prepared by the units of the information management section 10 are automatically registered in the OUT folder 51. When the new messages are actually transmitted, they are stored to the SENT folder 52. The message that has been transmitted to the present pager itself is automatically stored in the IN folder 53, and it is possible to recognize which kind of message has been received. The information management section 10, as shown in FIG. 4(*a*), displays every message separately, or alternatively list-displays a plurality of messages as shown in FIG. 4(*b*). The changing from one message displaying to the list-displaying is made by pressing a "INDEX" button 54 that is displayed on the screen for one message displaying. Alternatively, one message displaying is realized by touching a "VIEW" button 55 on the list-displaying screen.

Figure 5:
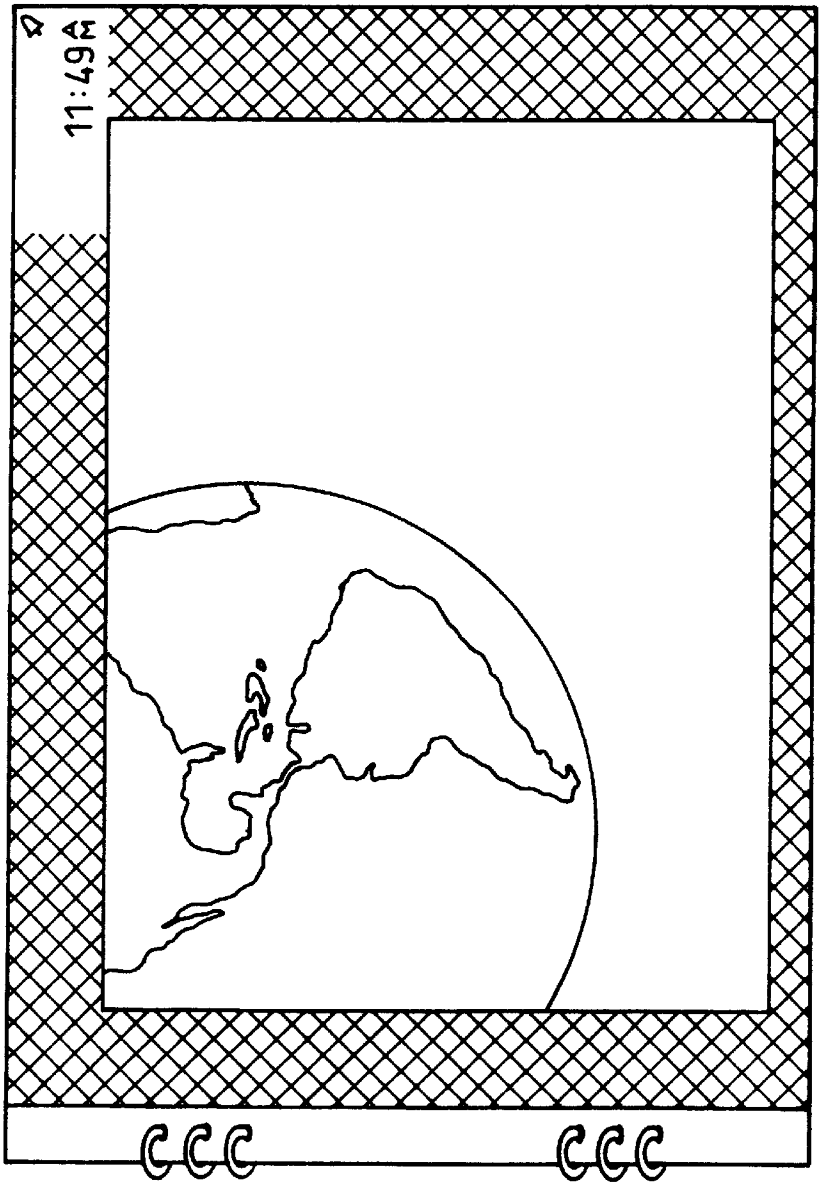
FIGS. 5(*a*) through 5(*f*) are explanatory views showing screen displaying examples, relating to access processing of the received message, of respective steps.
Figure 5B:
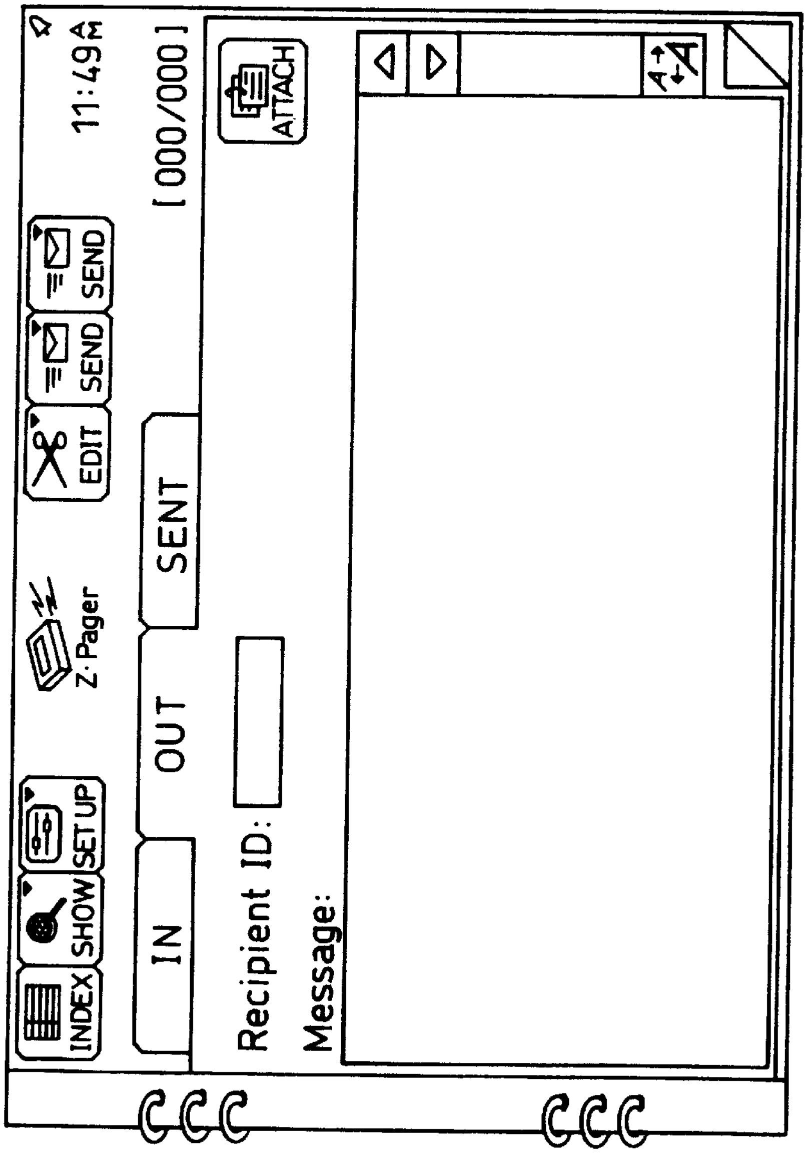
Figure 5:
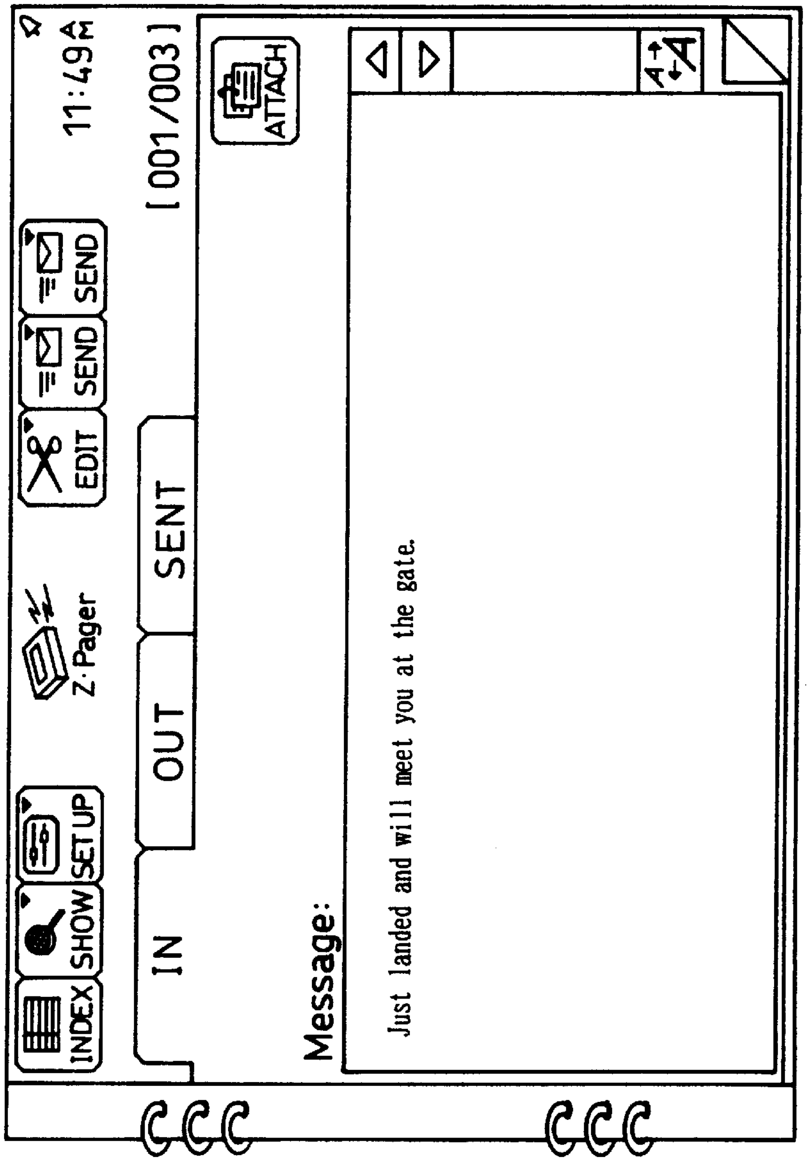
Figure 5:
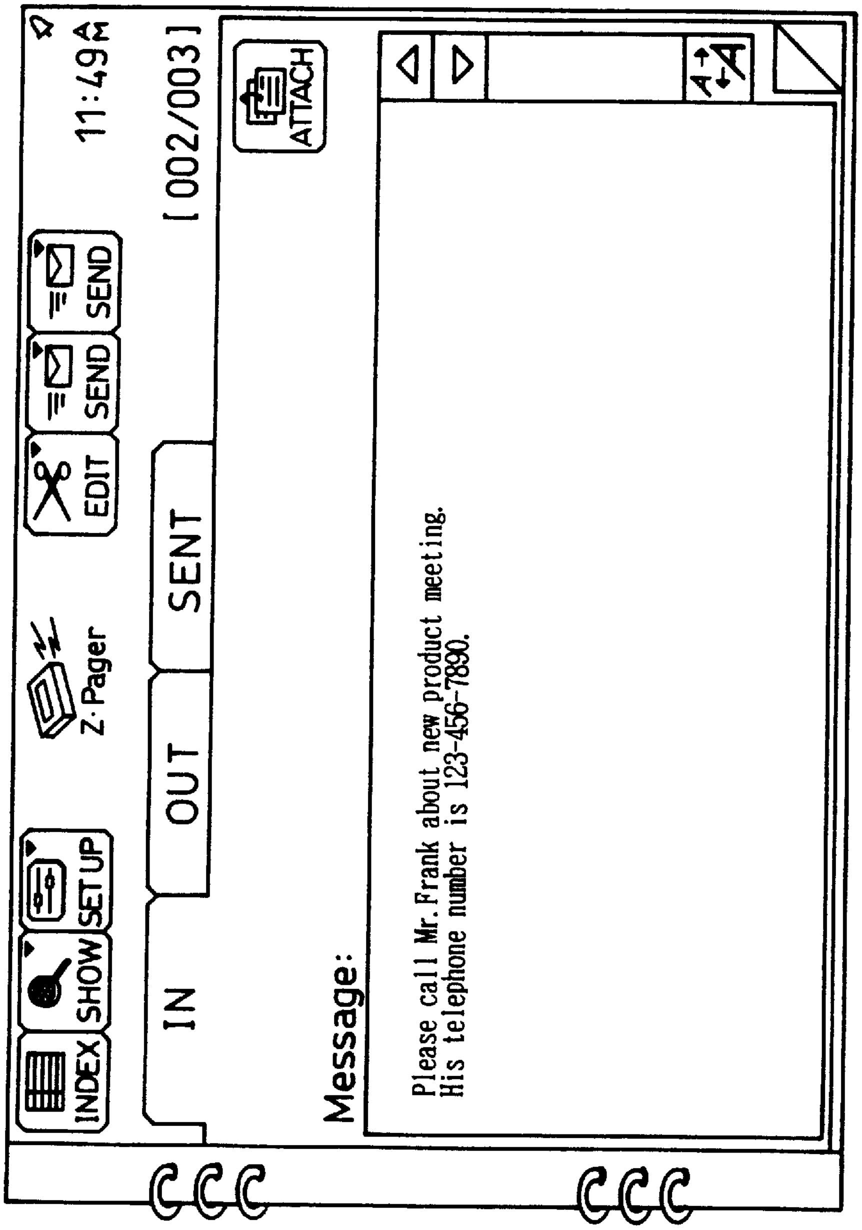
Figure 5E:
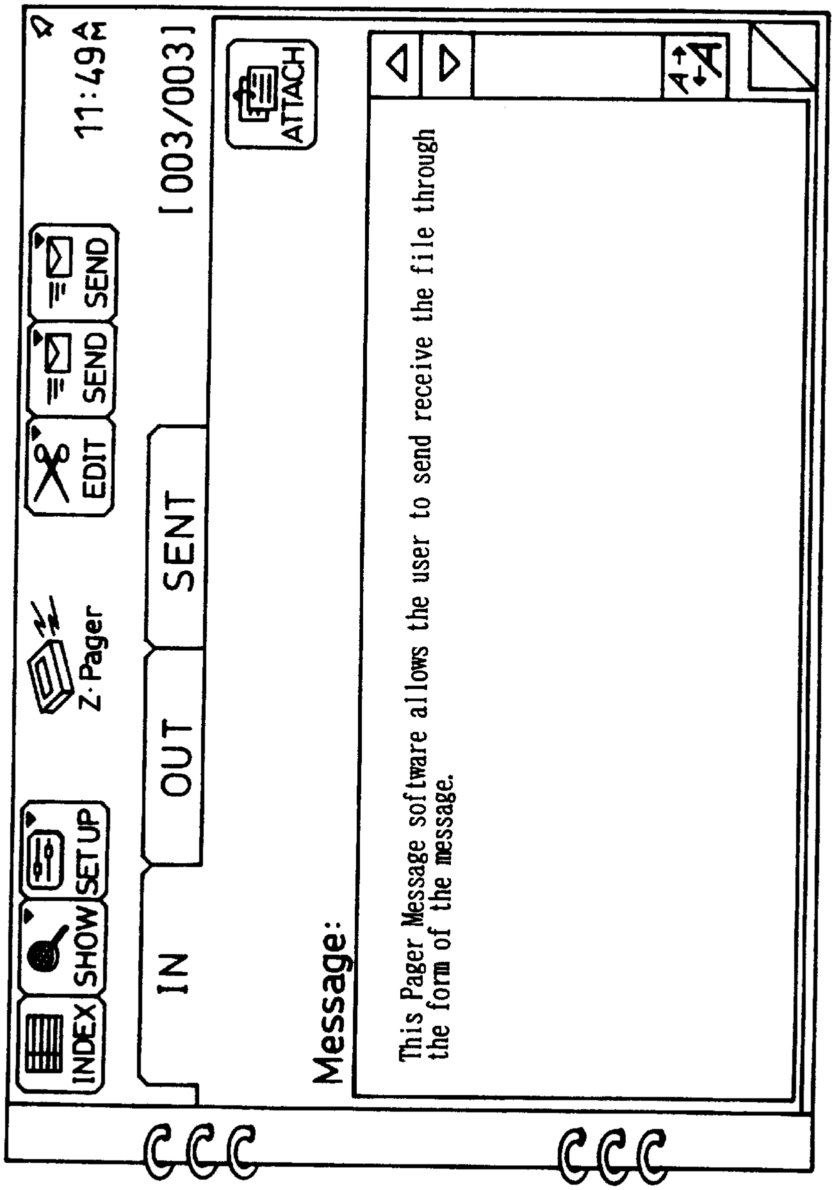
Figure 5F:
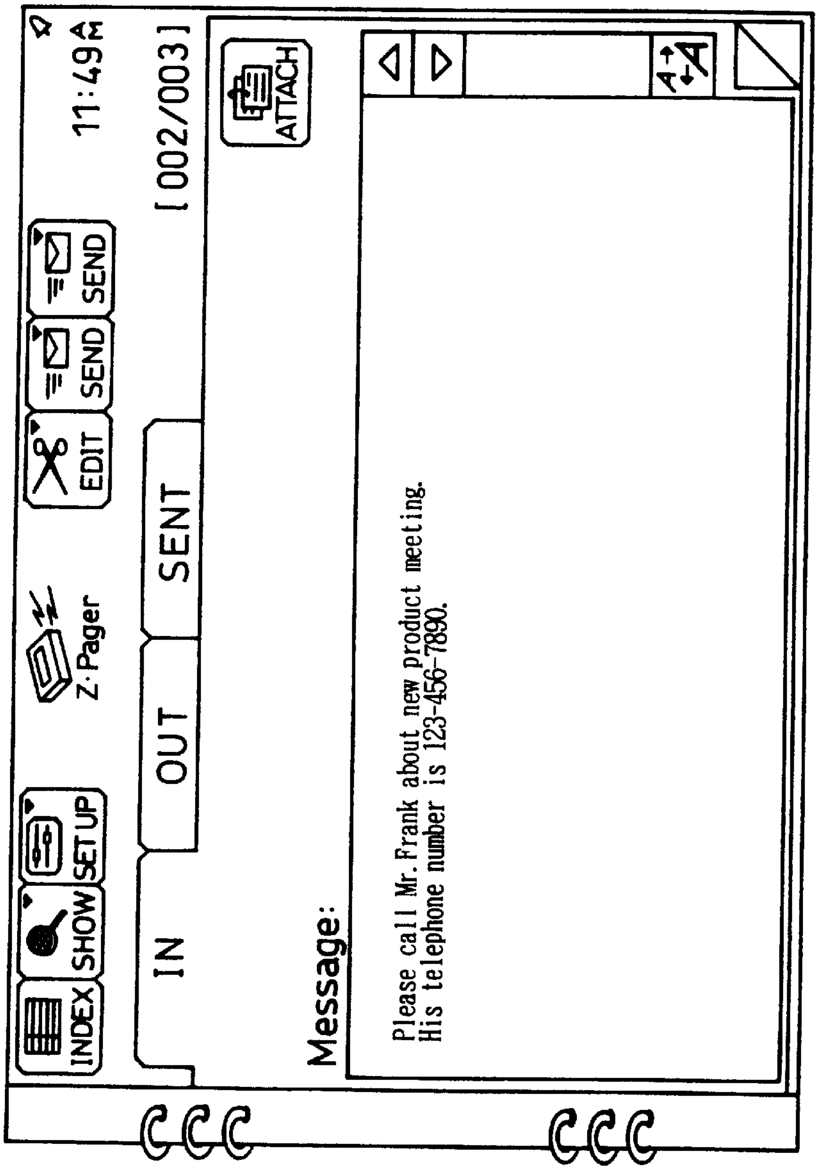

The following description deals with each step when verifying the received message that has been registered in the RAM 13 with reference to FIGS. 5(*a*) through 5(*f*). As shown in FIG. 5(*a*), after the power supply is given to the units of the information management section 10 by pressing the power supply key 41, a "Pager Message" key is pressed among the application keys 49 so as to select the pager message function. Therefore, the respective folders 51 through 53 are displayed as shown in FIG. 5(*b*). Then, the IN folder 53 is selected through the touch panel, thereby resulting in that the first received message is displayed (see FIG. 5(*c*)). By pressing an "Next" key among the search keys 47, the next received message, i.e., the second received message is displayed (see FIG. 5(*d*)). By further pressing the "Next" key, the third received message is displayed (see FIG. 5(*e*)). By pressing a "Prev" key among the search keys 47, the previous received message, i.e., the second received message is displayed (see FIG. 5(*f*)).

The present invention is realized by using the foregoing system which can transmit and receive data in the form of message. First, the following description deals with the operating procedure for transmitting and receiving by file unit.

The way how the pager message function is operable is the same as that shown in FIGS. 5(*a*) and 5(*b*). Thereafter, when the new input key 43 is pressed, the units of the information management section 10 displays a new input screen for a transmitting-use pager message (see FIG. 6(*a*)). Like the data which is ordinarily transmitted and received, the input screen for one pager message has (1) a field 61 for inputting an identification number of an addressee and (2) a field 62 for inputting a message. According to the present invention, an "Attach" button 63 is added to the fields 61 and 62.

Figure 6:
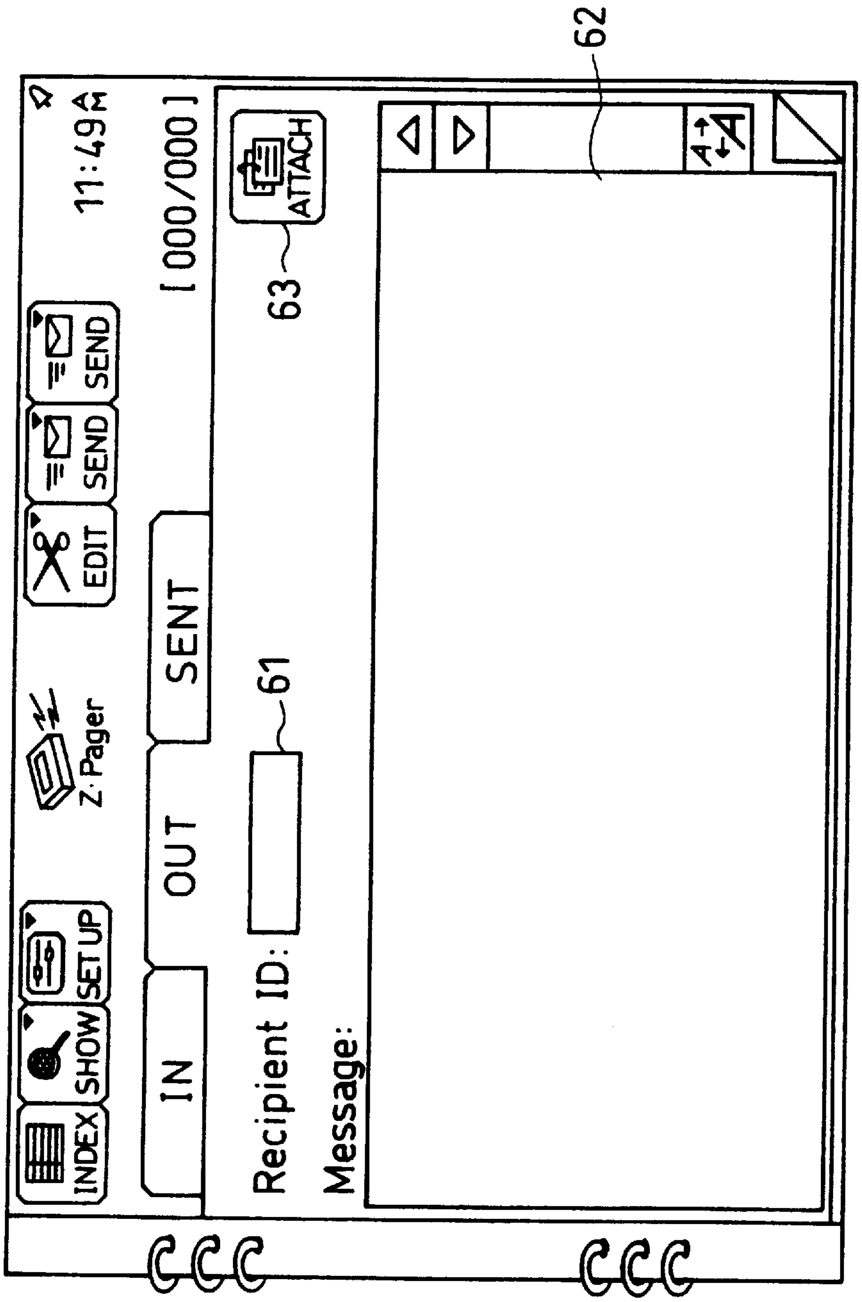
FIGS. 6(*a*) through 6(*f*) are explanatory views showing screen displaying examples, relating to preparation processing of message to be transmitted, of respective steps.
Figure 6:
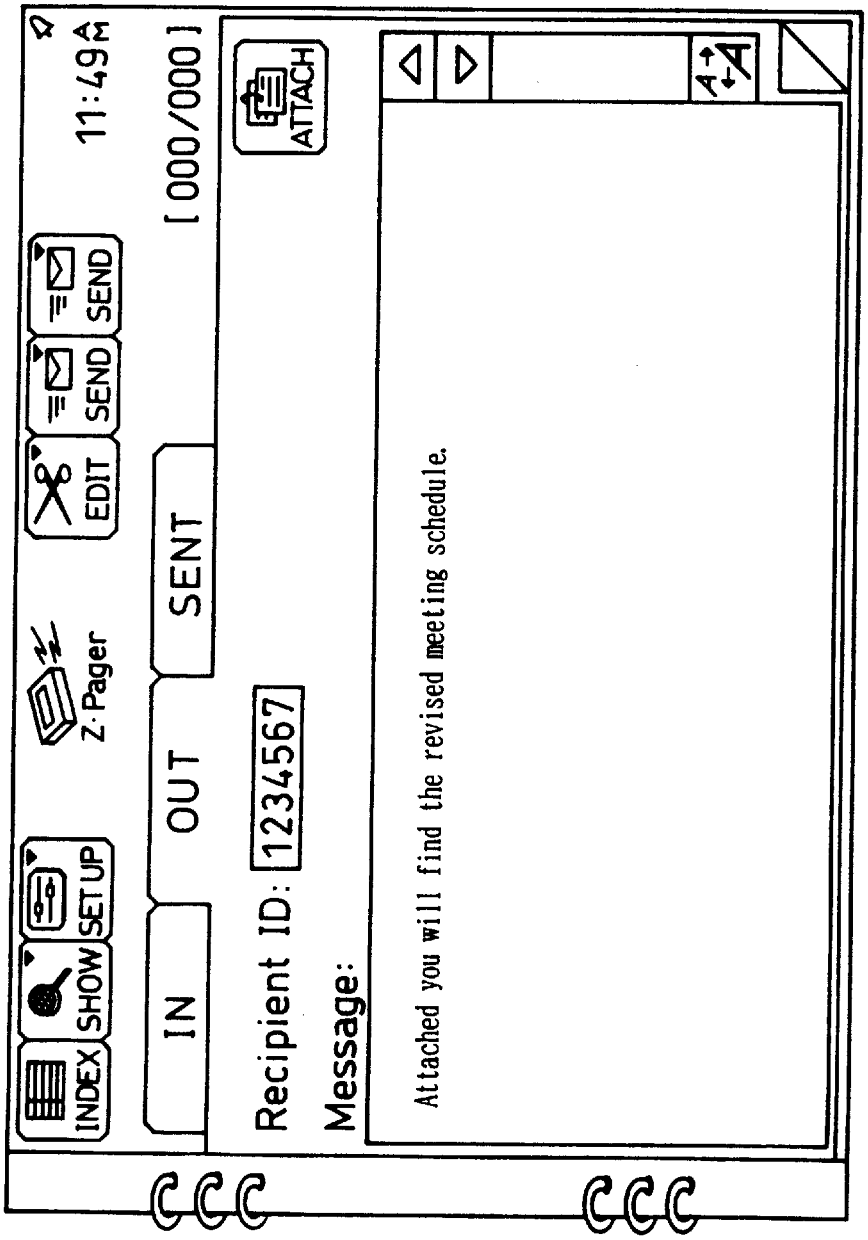
Figure 6C:
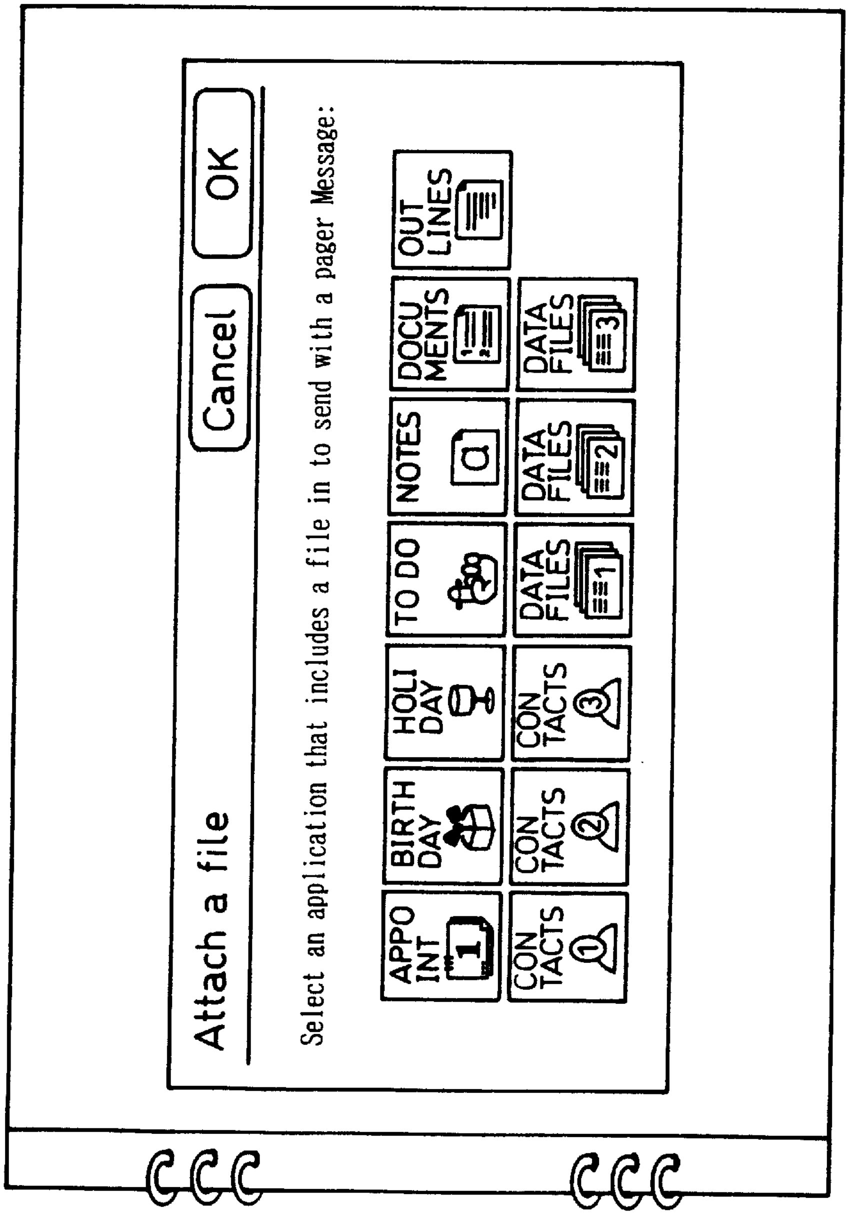
Figure 6D:
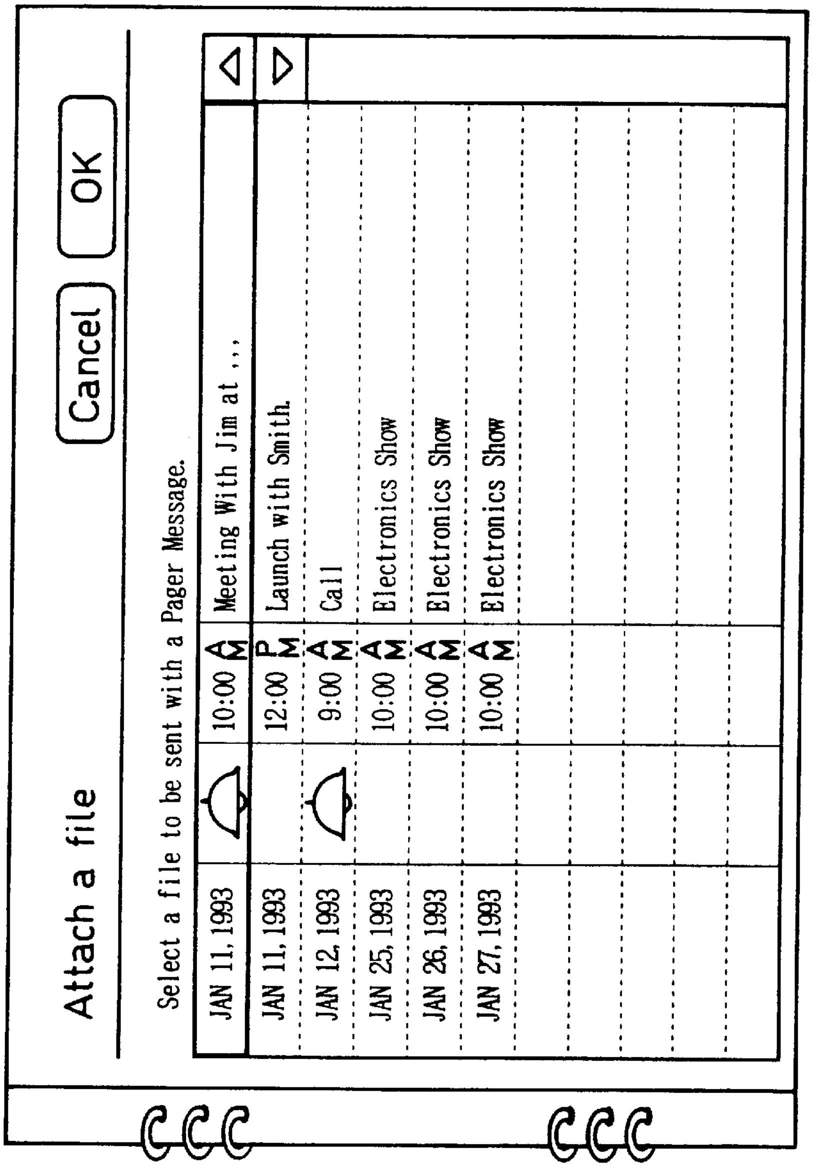
Figure 6E:
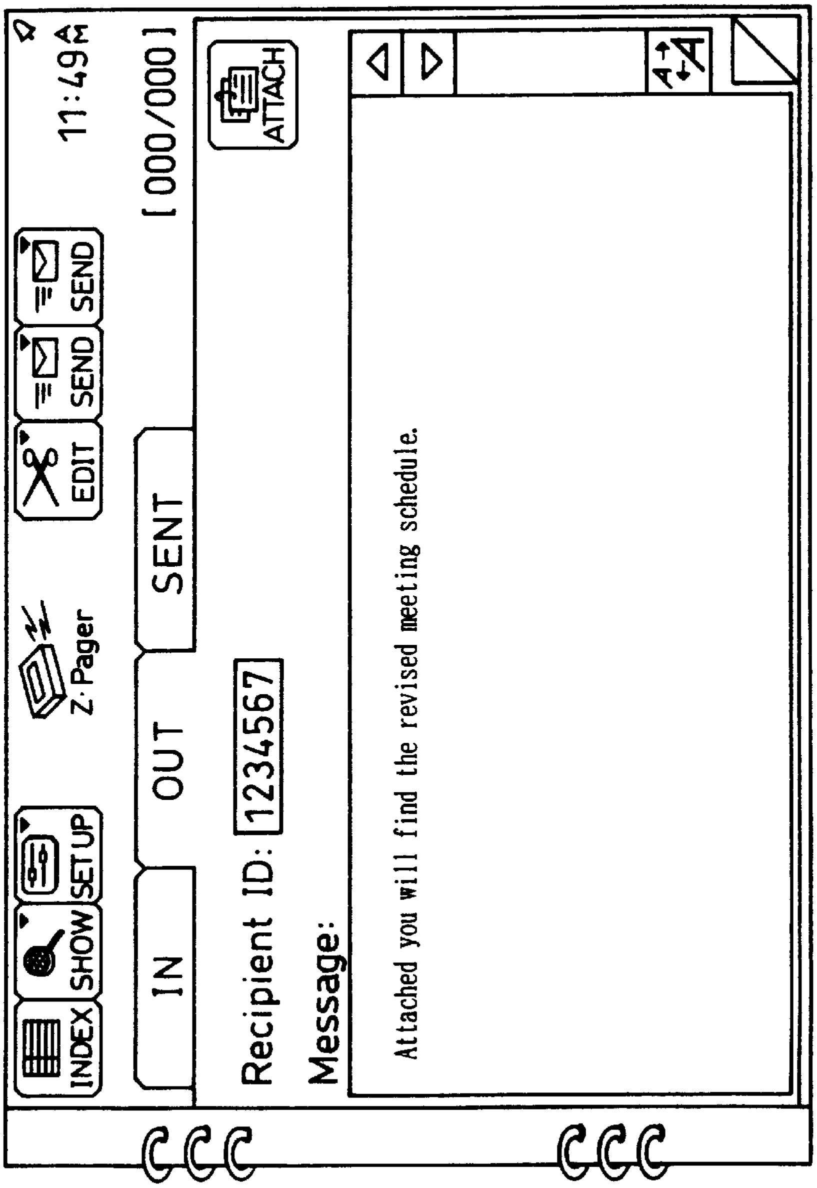
Figure 6F:
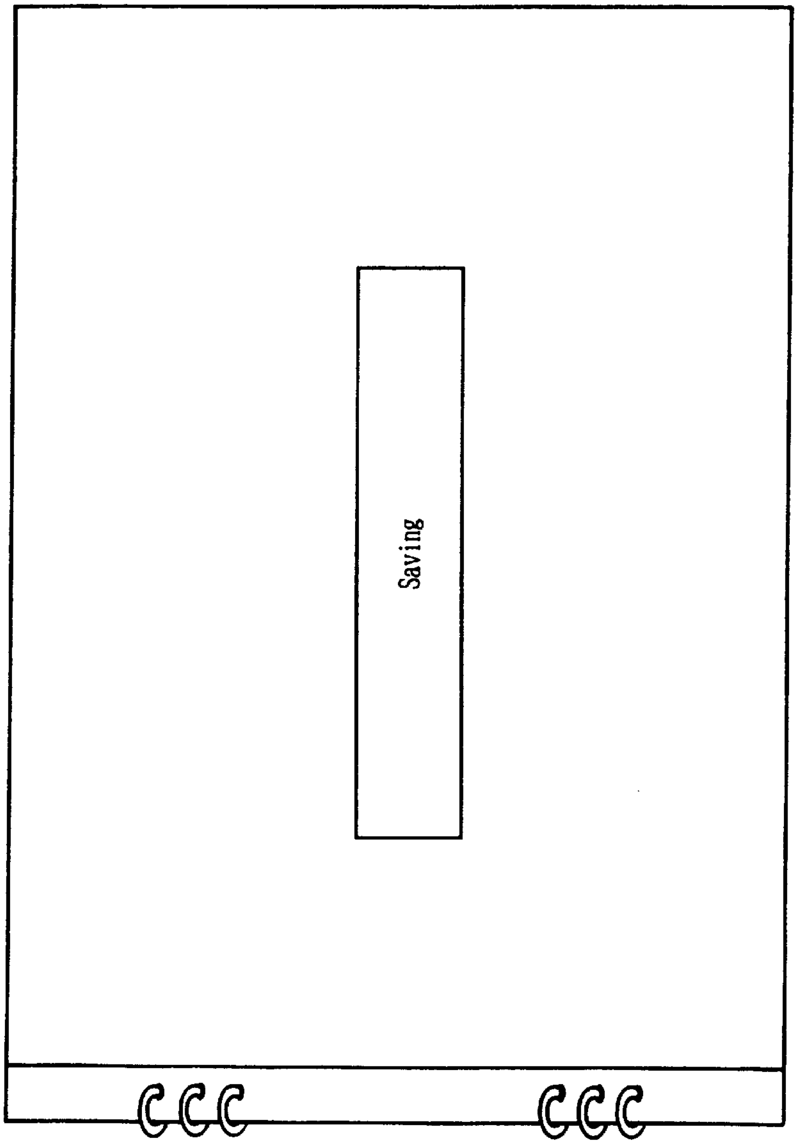

As shown in FIG. 6(*b*), after an identification number of an addressee and a target message are inputted through the respective fields on the input screen for one pager message, when the "Attach" button 63 is pressed, an application selection screen is displayed as shown in FIG. 6(*c*). Through the application selection screen, the user can select an application for a file to be transmitted.

When the user touches and selects an application on the application selection screen and presses an "OK" button, the screen is changed to a list-displaying screen of files relating to the selected application (see FIG. 6(*d*)). When the user selects a target file to be transmitted from the list on the list-displaying screen by using cursor keys or touching and presses the "OK" button, the selected file is converted into the form of message and is added to the pager message that is now being prepared. Then, the screen is changed to the input screen for one pager message as shown in FIG. 6(*e*). At this time, when the register key 45 is pressed, the message data that is now being prepared is registered in RAM 13 (see FIG. 6(*f*)). The transmitting-use data thus registered is automatically stored in the OUT folder 51 as mentioned above.

Figure 7:
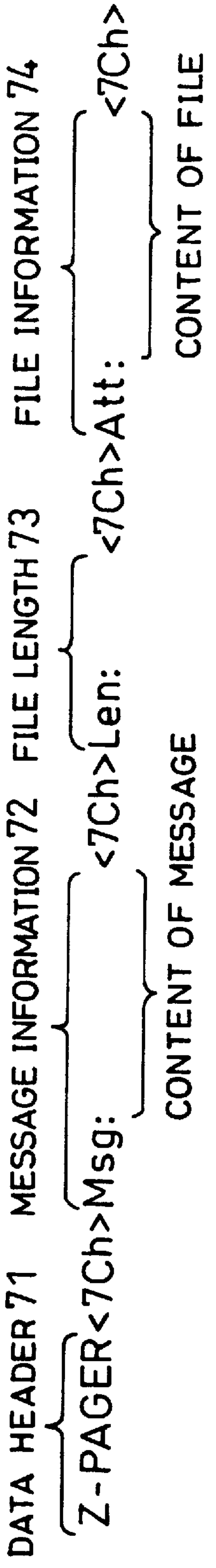
FIGS. 7(*a*) through 7(*c*) are explanatory views showing rule/format for converting of a file and a data structure.
Figure 7:
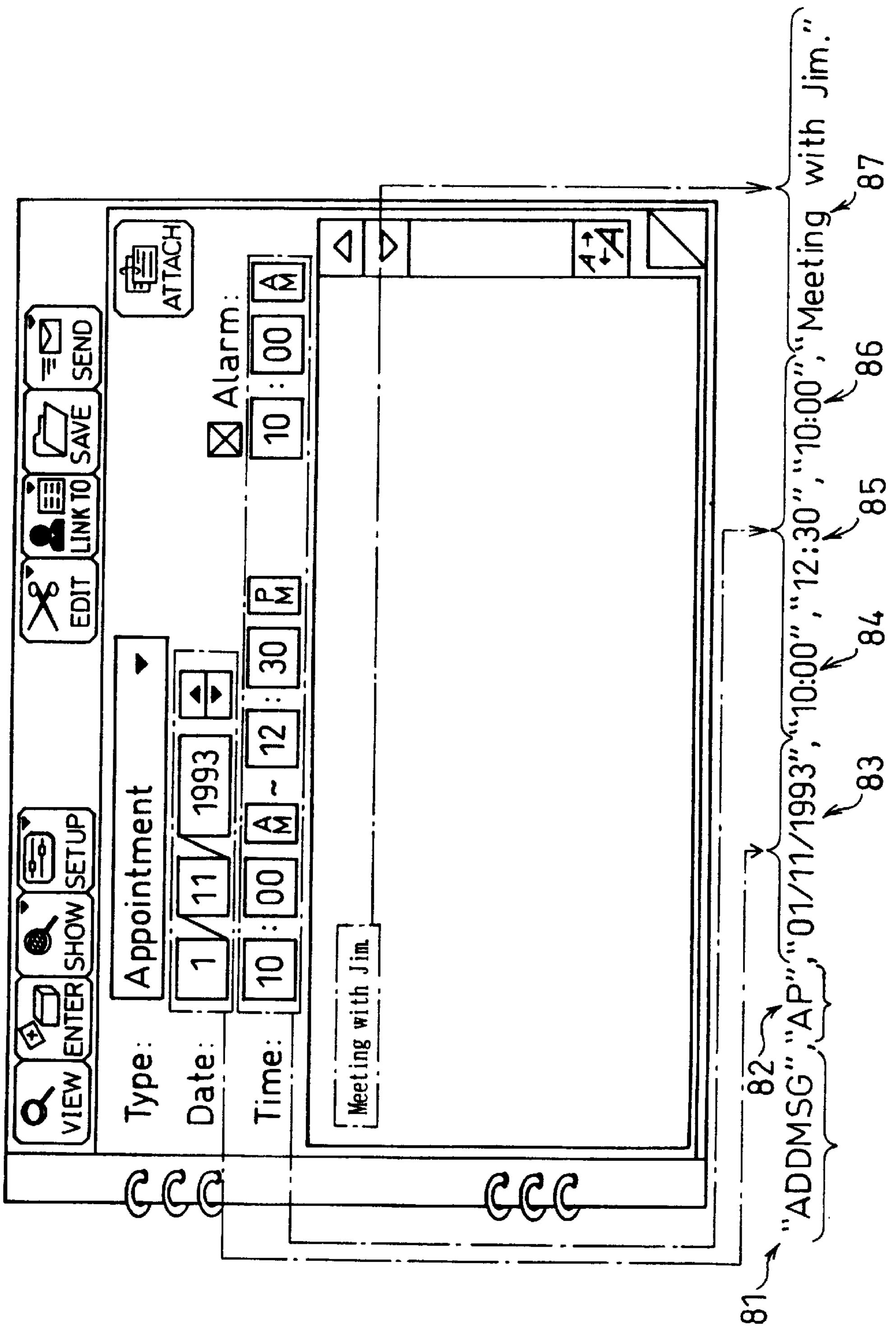
Figure 7C:
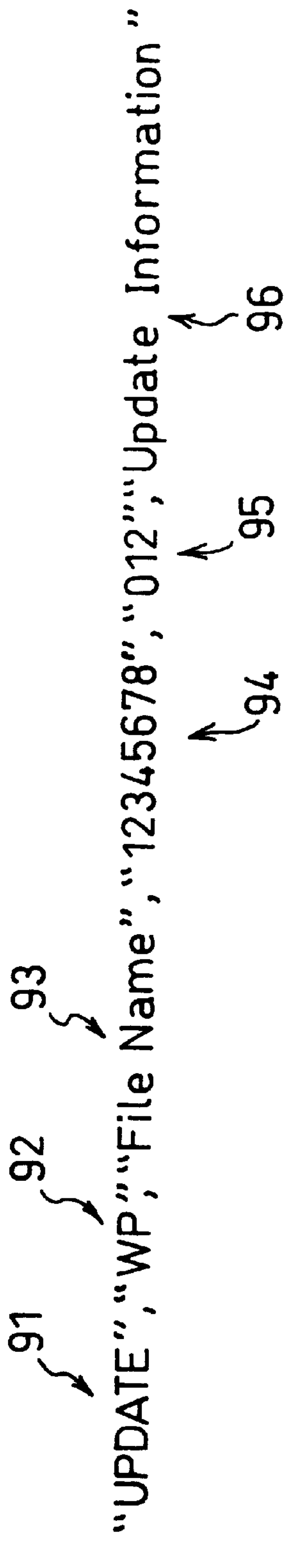

The following description deals with a data structure of the pager message including the file that has been converted into the form of message with reference to FIGS. 7(*a*) and 7(*b*). More specifically, as shown in FIG. 7(*a*), according to the message data of the present embodiment, an area for the message to be transmitted by use of a pager is usually divided into four (4) fields, i.e., a data header 71, message information 72, a file length 73, file information 74. Note that the file information 74 is the file that has been converted into the form of message. A predetermined code 7Ch is added to the end of each field as a separator while a series of characters are automatically added to the head end of each field. With the addition, the portable station judges the received message as the data prepared by the pager message function. Note that when the "h" of the code as the separator indicates that the code is expressed in accordance with the hexadecimal notation.

More specifically, a series of characters "Z-PRAGER" are added with respect to the head end of the data header 71, thereby indicating that the data has been prepared by the pager message function. The message information 72 is arranged so that a series of characters "Msg:" are added just before a series of characters inputted in the message field 62 (see FIG. 6(*a*)). In the file length 73, a series of characters "Len" are added before a series of characters indicative of the number of characters of the file information 74. A series of characters "Att" are added to the head end of the file information 74.

The file information 74 is obtained by converting a file into a message in accordance with a predetermined rule. More specifically, as shown in FIG. 7(*b*), the file information 74 is the data of CSV method. According to the CSV method, each content of the fields constituting a file is indicated by double quotation (" "), and comma (,) is added between the fields as the separator. Note that methods, other than the CSV method, such as the DBF method or the SDF method may be adopted as the rule for converting a file into a message. A series of characters "ADDMSG" are added just before the first field. This causes the portable station 3 to judge that the received data is a newly added file, not for updating the file (later described).

For example, FIG. 7(*b*) shows a case of schedule data. In the file information 74, the first field 81 is a series of characters "ADDMSG" indicative of a newly added file, the second field 82 is a series of characters "AP" indicative of data prepared by the schedule function. The third through fifth fields 83 through 85 indicate date of the schedule, starting time, and ending time, respectively. The sixth field 86 indicates the time when the user is informed of the schedule. The last field 87 is comments indicative of the content of the schedule.

These message data, irrespective of the file format of the schedule function, is composed of only code sets that the pager system can communicate. Accordingly, like the ordinary message, these message data are transmitted and received through a conventional pager system, and are stored in the RAM 13.

The pager message stored in the RAM 13 is transmitted by touching an "SEND" button displayed on a screen indicative of the pager message function. More specifically, when the "SEND" button shown in FIG. 8(*a*) is touched, a screen, for selecting whether one displayed message should be transmitted or all the messages stored in the OUT folder 51 should be summarized and transmitted, is displayed (see FIG. 8(*b*)). When the "OK" button is pressed after selecting a message unit to be transmitted, the units of the information management section 10 prepares a message data in accordance with each message and the identification number of the addresser and then starts to transmit the message data from the modem section 30 to the radio basic station 2 through the public telephone network (see FIG. 3 and FIG. 8(*c*)). The message that has been transmitted to the radio basic station 2 is radio-transmitted from the radio basic station 2 to the portable station 3. The portable station 3 proceeds to receive the message as mentioned above. The message that has been received by the units of the information management section 10 and has been registered in the RAM 13 is store in the IN folder 53. By selecting the IN folder 53 by use of the pager message function, it is possible to verify the received messages in a list-displayed manner (see FIG. 9(*a*)).

Figure 9:
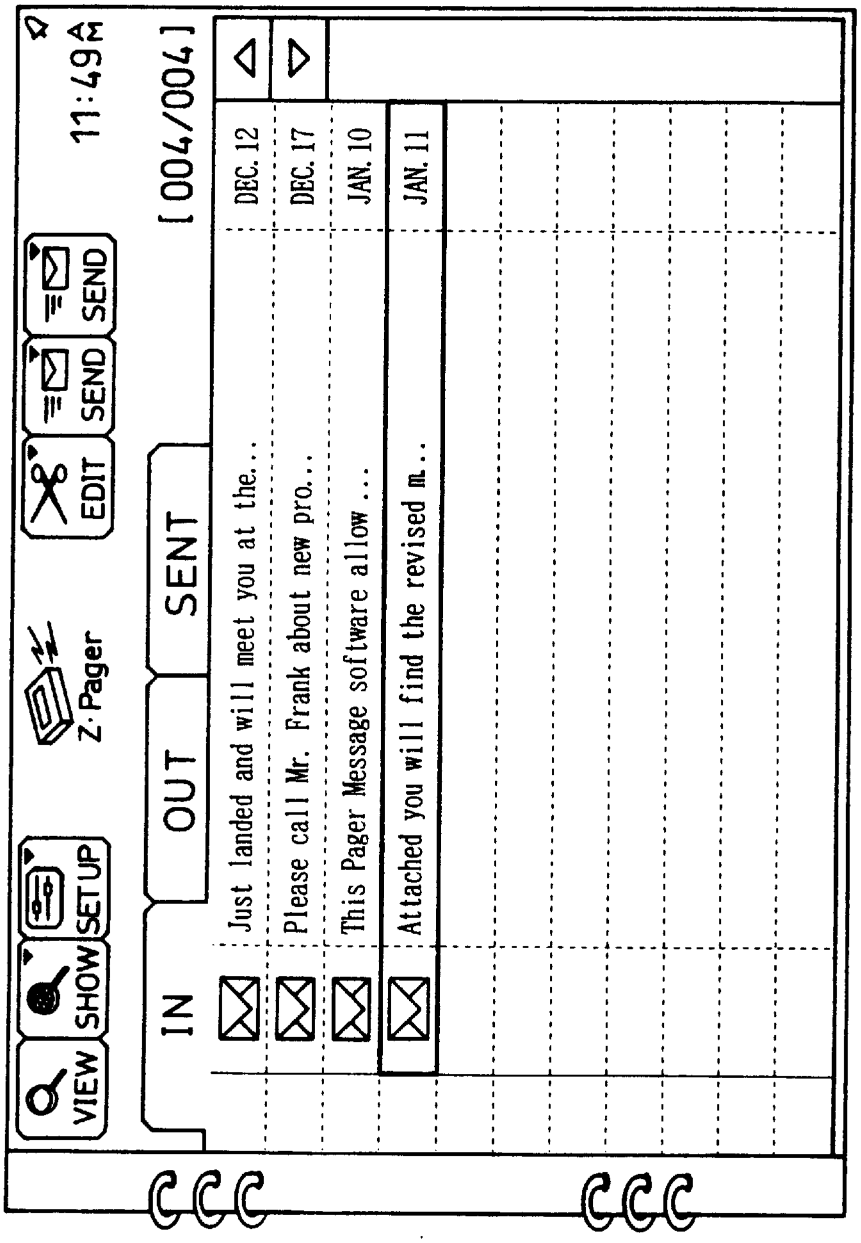
FIGS. 9(*a*) through 9(*e*) are explanatory views showing screen displaying examples, relating to verification processing of the received message/file conversion processing, of respective steps.
Figure 9B:
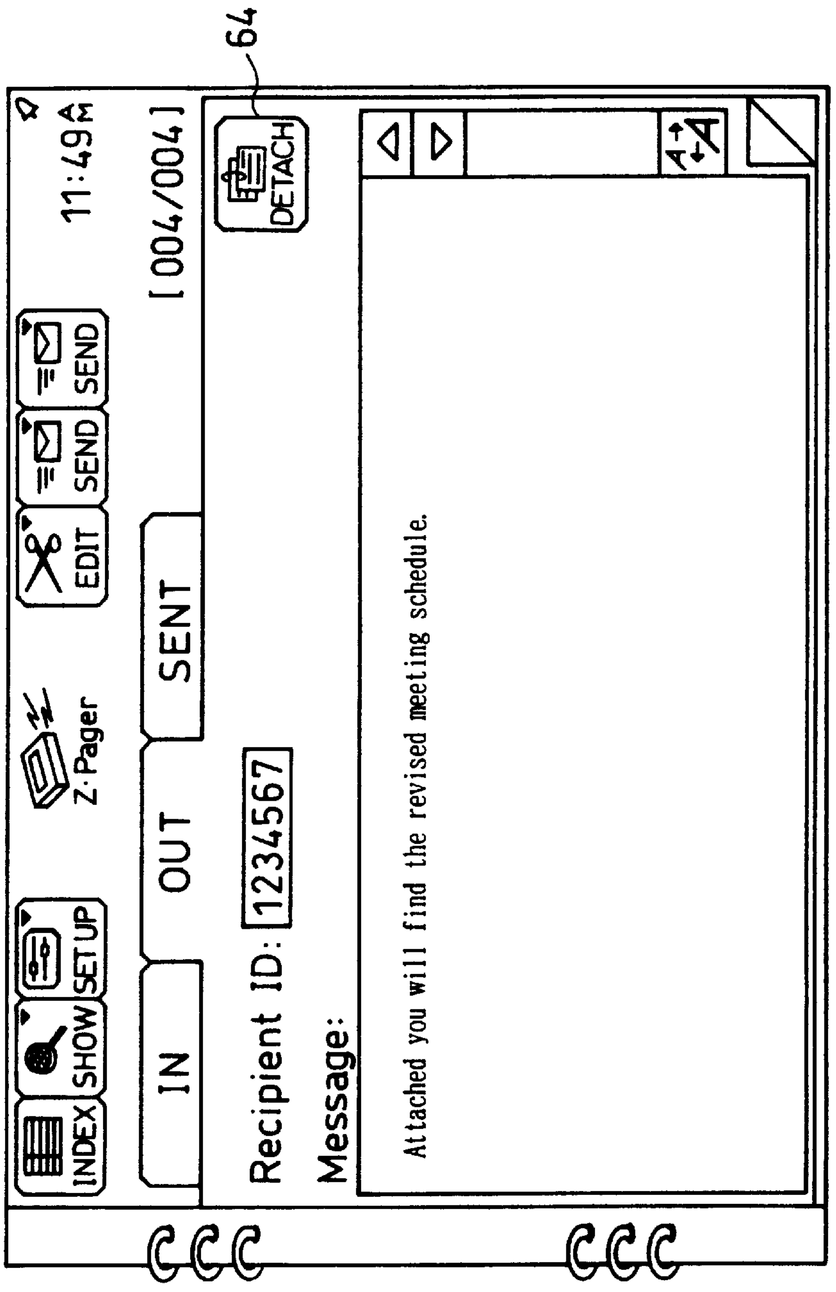
Figure 9C:
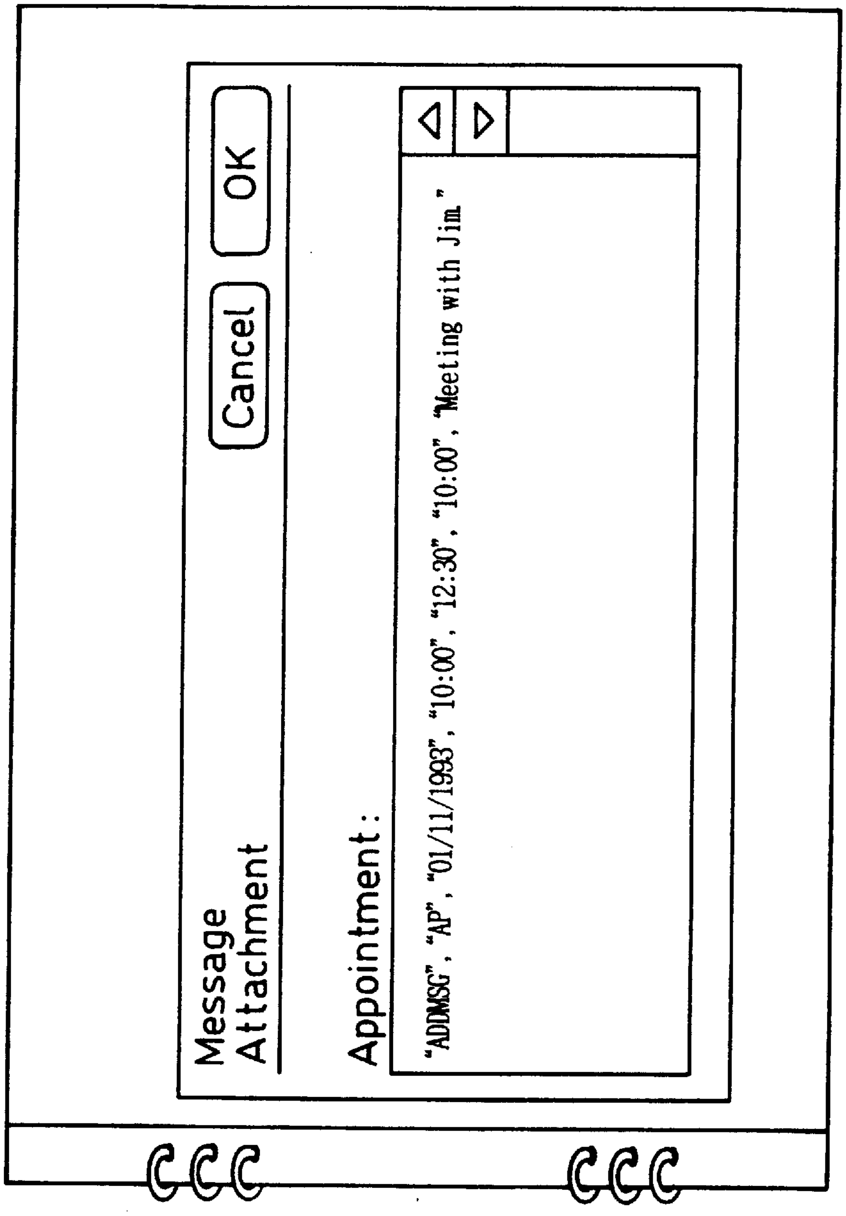
Figure 9D:
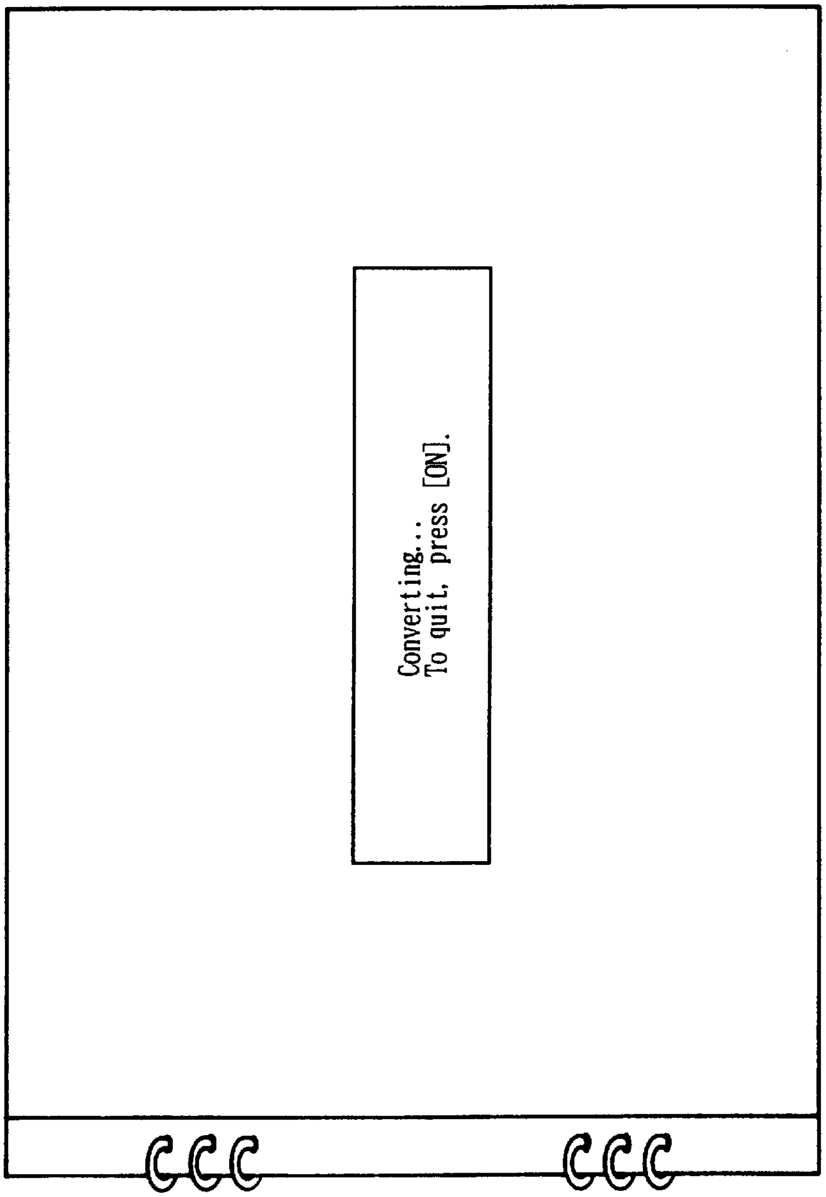
Figure 9:
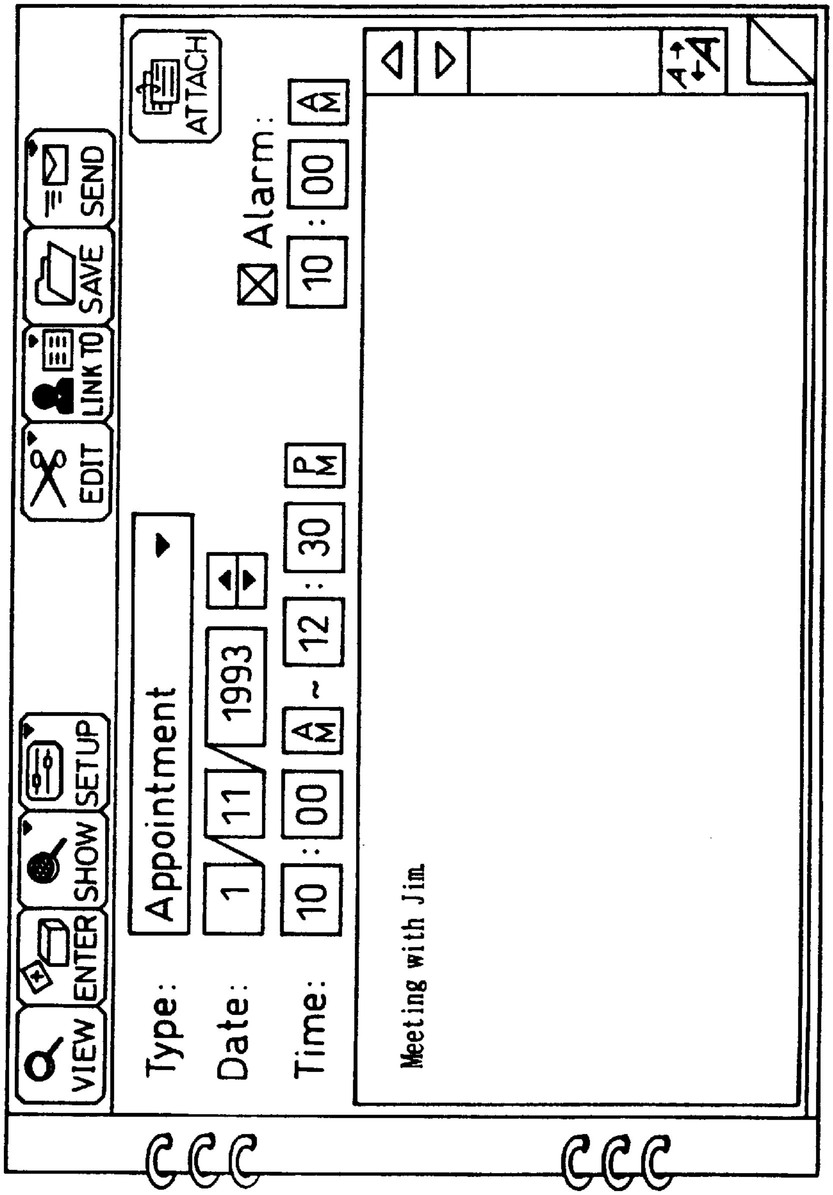

For example, by selecting from the list the message which the user wishes to view its detail content and pressing a "VIEW" button 55, it is possible to view the content of the received message in detail (see FIG. 9(*b*)). During displaying one message, when there are a series of characters "Z-PAGER" at the head end of the data that has been received, the information management section 10 judges that the received message is the data prepared by the pager message function and picks up the part corresponding to the message information 72 (see FIG. 7(*a*)) for displaying thereof. More specifically, in the message data, the part starting from "Msg:" and ending to 7Ch are dealt with as the message information 72.

In contrast, when there are not a series of characters "Z-PAGER" at the head end of the data, the content of the message is displayed as it is on the screen for one message displaying. This is because the received message is not the data prepared by the pager message function.

The fact that the received message is the data prepared by the pager message function and the numerical value of the file length 73 in the data is not zero indicates that the file information 74 is added to the message. In such a case, the information management section 10 displays a "Detach" button 64 on the screen for one message displaying (see FIG. 9(*b*)). When the "Detach" button 64 is pressed, the content of the file information 74 is displayed as shown in FIG. 9(*c*). On the screen, when the "OK" button is pressed, the file information 74 in the message is restored to the file in a manner reverse to the procedure wherein the file is converted into the message, thereafter can be stored in the RAM 13 as the data of each application (see FIG. 9(*d*)). The data thus stored can be verified, for example, by pressing the application key 49 so that the application starts, like the verification of the data that is prepared by its own information management section 10 (see FIG. 9(*e*)). Note that since FIG. 9(*e*) shows the case where the schedule data has been received, the user can verify the data by starting the schedule application and pressing an "Appointment" key among the displayed function keys.

According to the foregoing procedure, the transmitting and receiving can be carried out by file unit through the form of message while the conventional pager system is used as it is. More specifically, according to the present cummunication system, even though the file, such as a file prepared in the form of binary, having codes that, in the conventional pager system, can not be transmitted as they are, it is possible to carry out the transmission by file unit. Accordingly, without changing the pager system, for example, without changing the code sets, it is possible to transmit and receive a file prepared by arbitrary code sets only by changing each information management section 10 of the addresser and addressee.

The following description deals with the operating procedure for the system that updates a file that has been changed. According to the updating system of the present invention, the information relating to updating of a file (hereinafter referred to as file updating information) is transmitted in the form of message of the pager from the person who has updated a file to the persons who share the file.

The following description deals with how to prepare the file updating information in the form of the message of the pager. The following description deals with the case where the file updating information is prepared with respect to the file prepared by wordprocessor function owned by the units of the information management section 10 with reference to FIGS. 10(*a*) through 10(*g*). The addresser who transmits the file updating information addresses the file to be changed prepared by the wordprocessor function (see FIG. 10(*a*)), thereafter specifies the part to be changed by emphasizing fonts such as bold-faced type or underline during changing its content. Note that the part to be changed is specified by bold-faced type and underline according to the present embodiment. For example, in the case of the RTF format that has a file format widely used in such as the softwares of wordprocessors, a file is divided into first and second blocks. A series of characters are stored in the first block while an attribute that modifies each character, i.e., a font to be used or a character style is stored in the second block.

Figure 10:
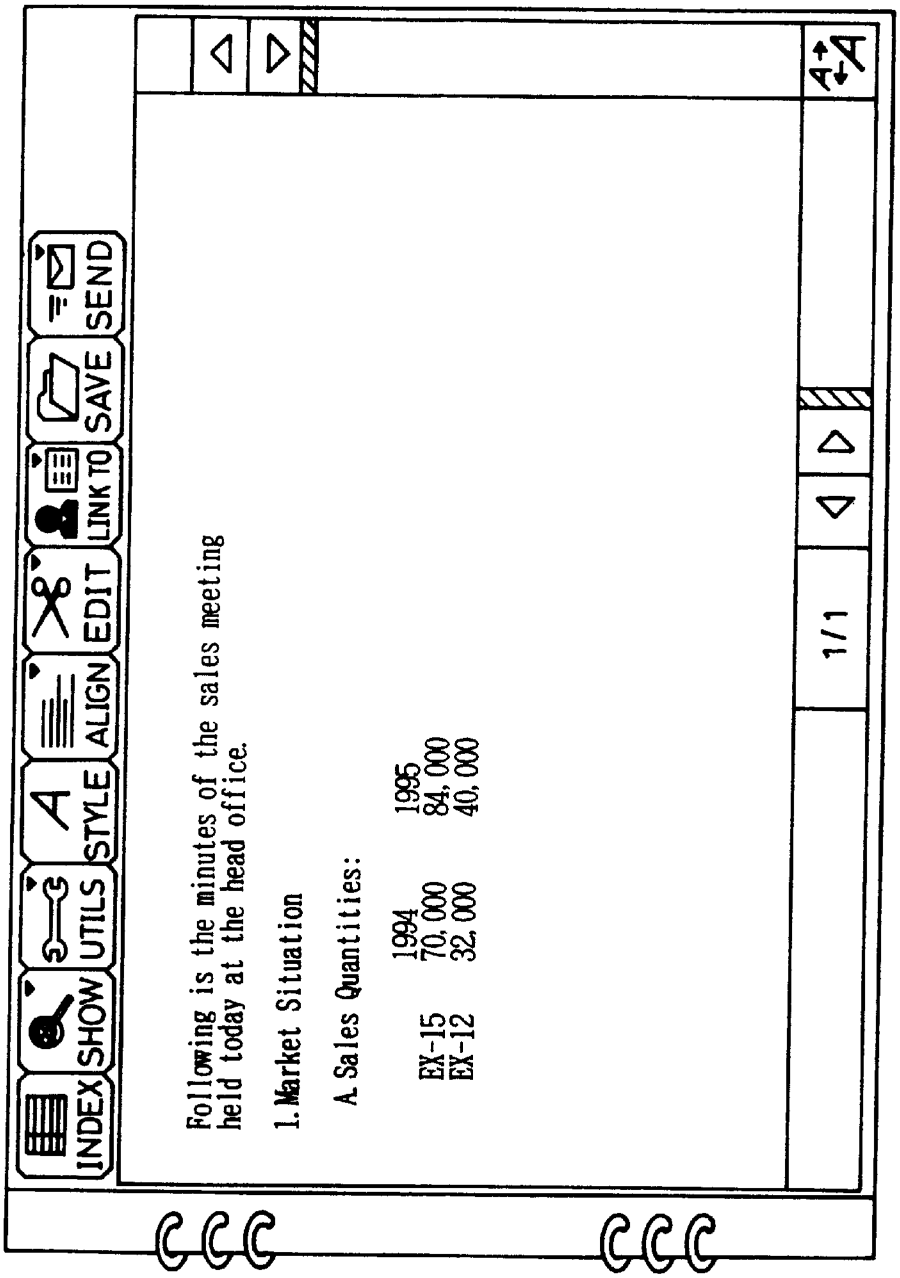
FIGS. 10(*a*) through 10(*g*) are explanatory views showing screen displaying examples, relating to preparation processing of a updated information file, of respective steps.
Figure 10:
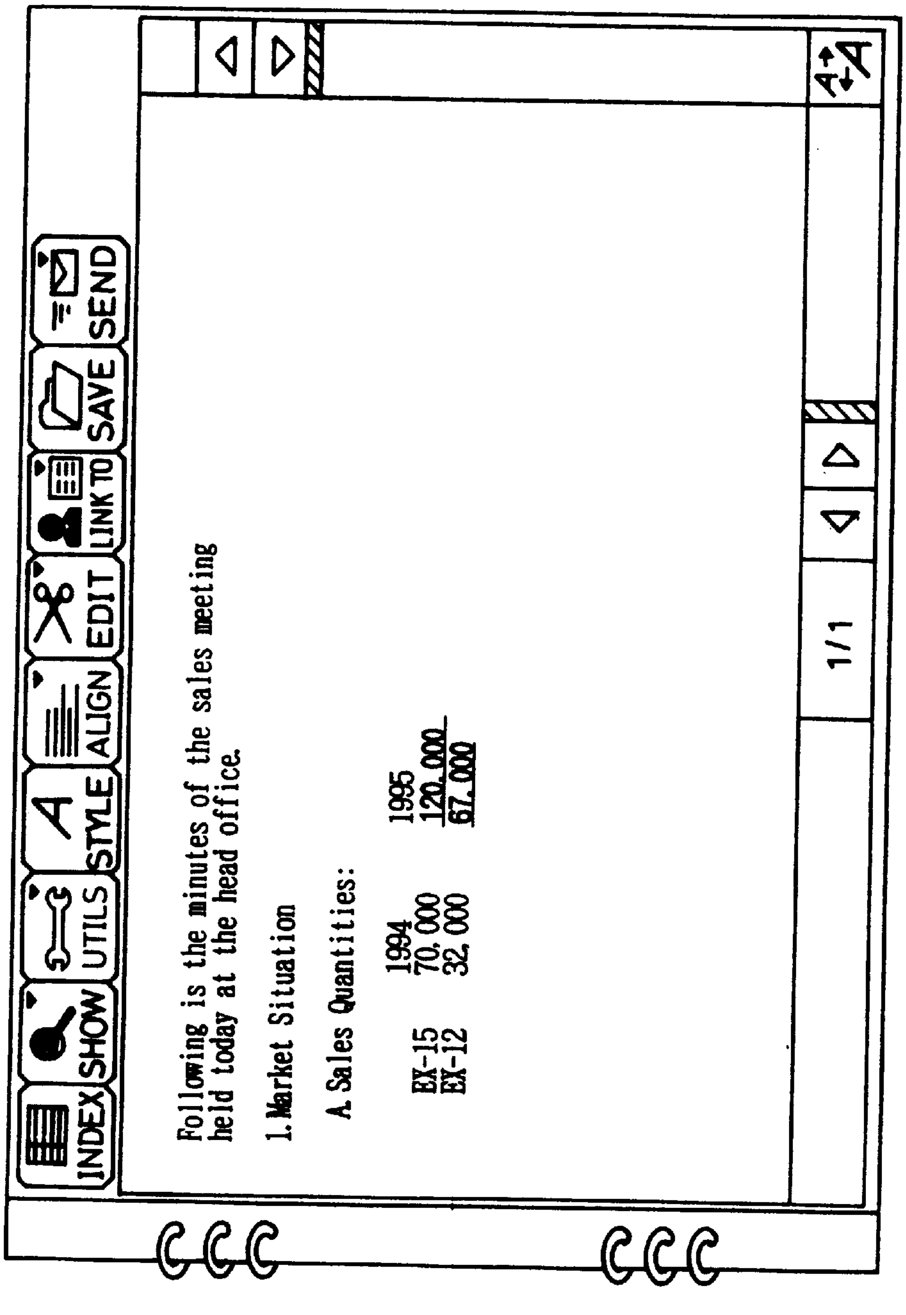
Figure 10C:
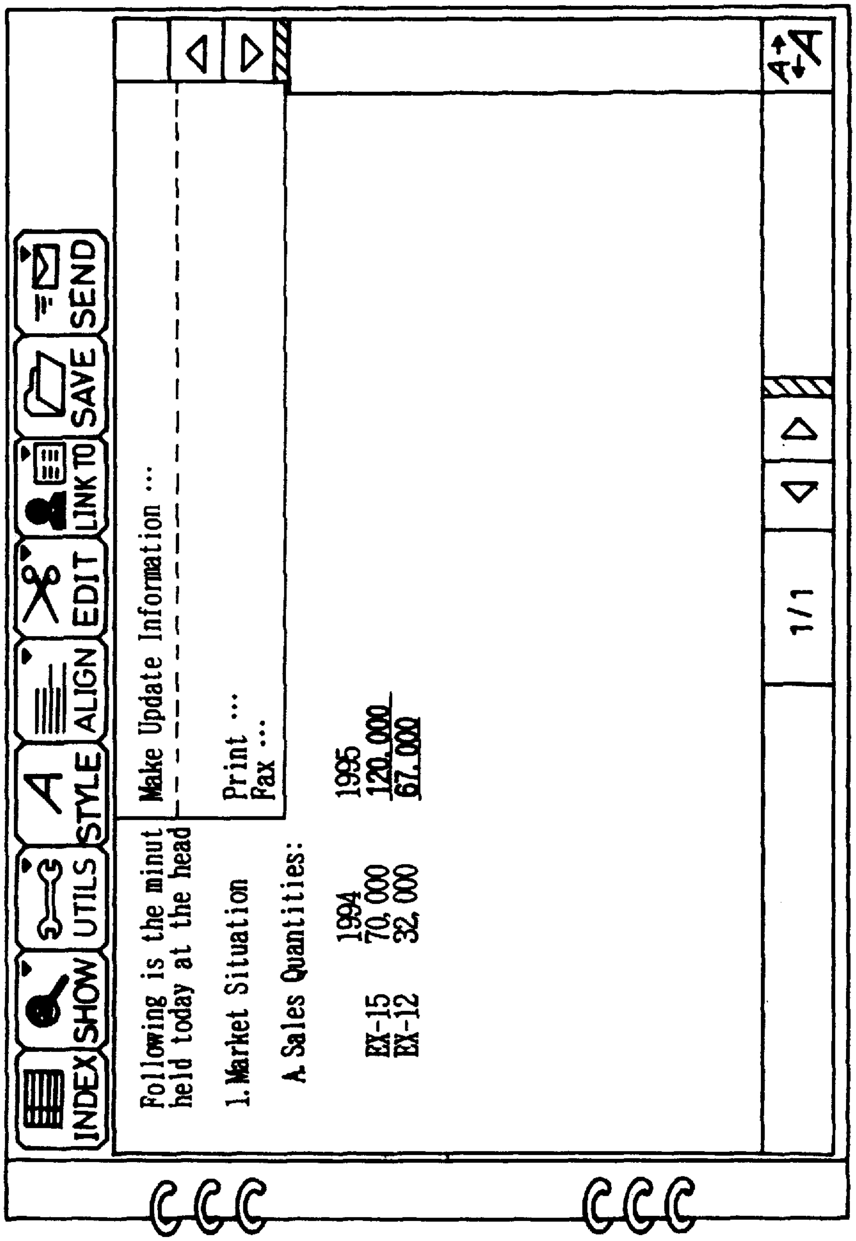
Figure 10D:
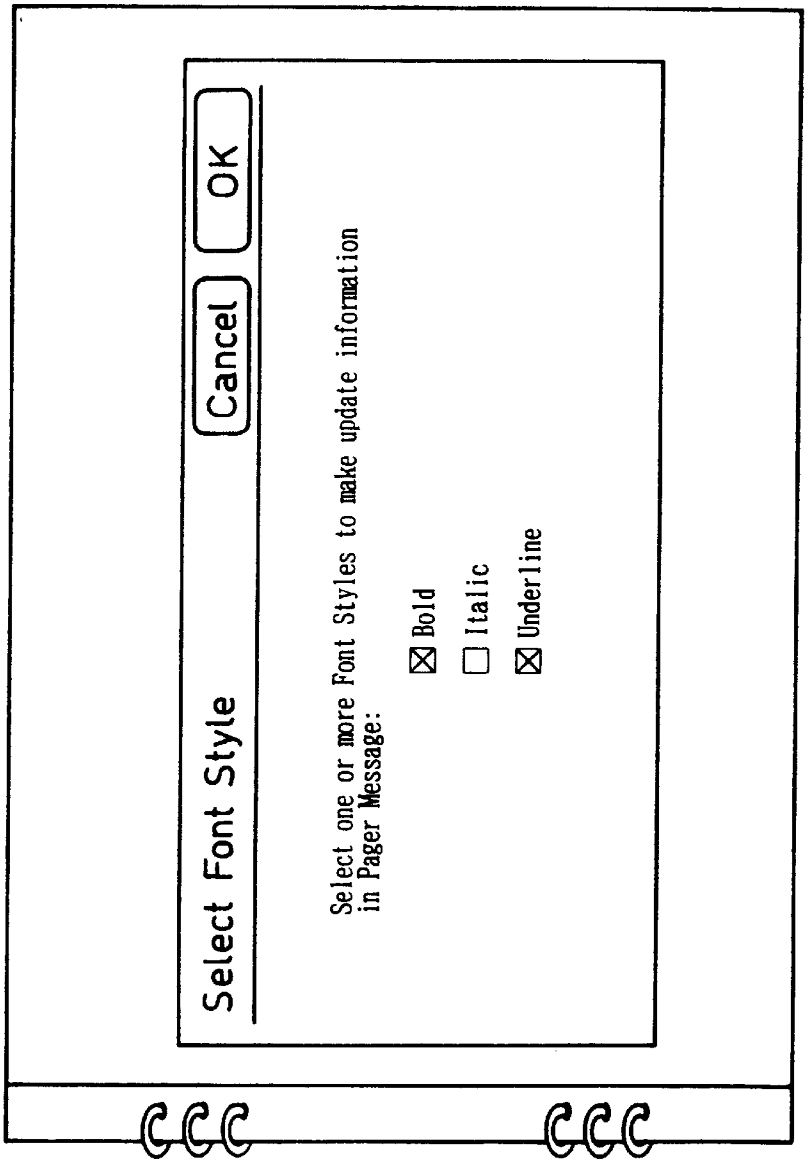
Figure 10E:
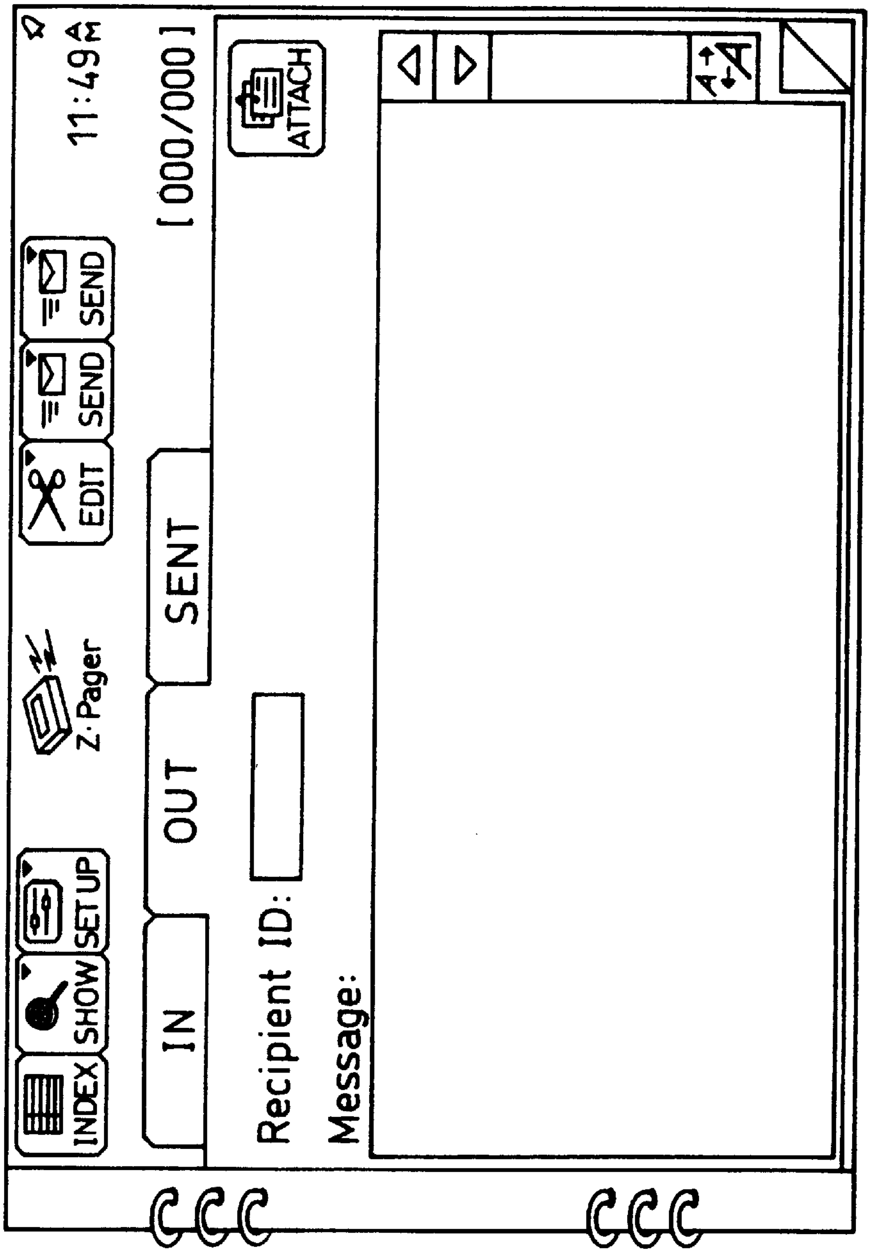
Figure 10F:
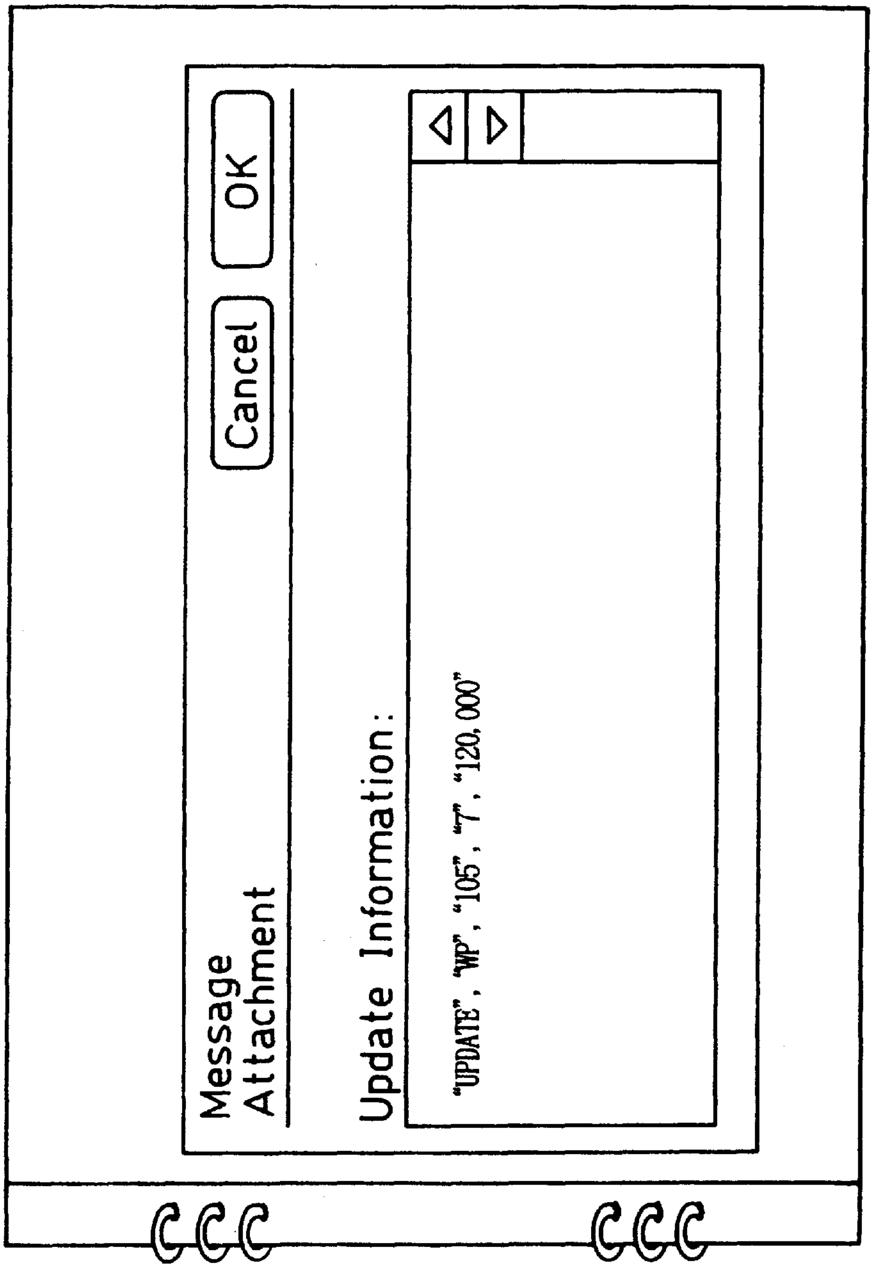
Figure 10G:
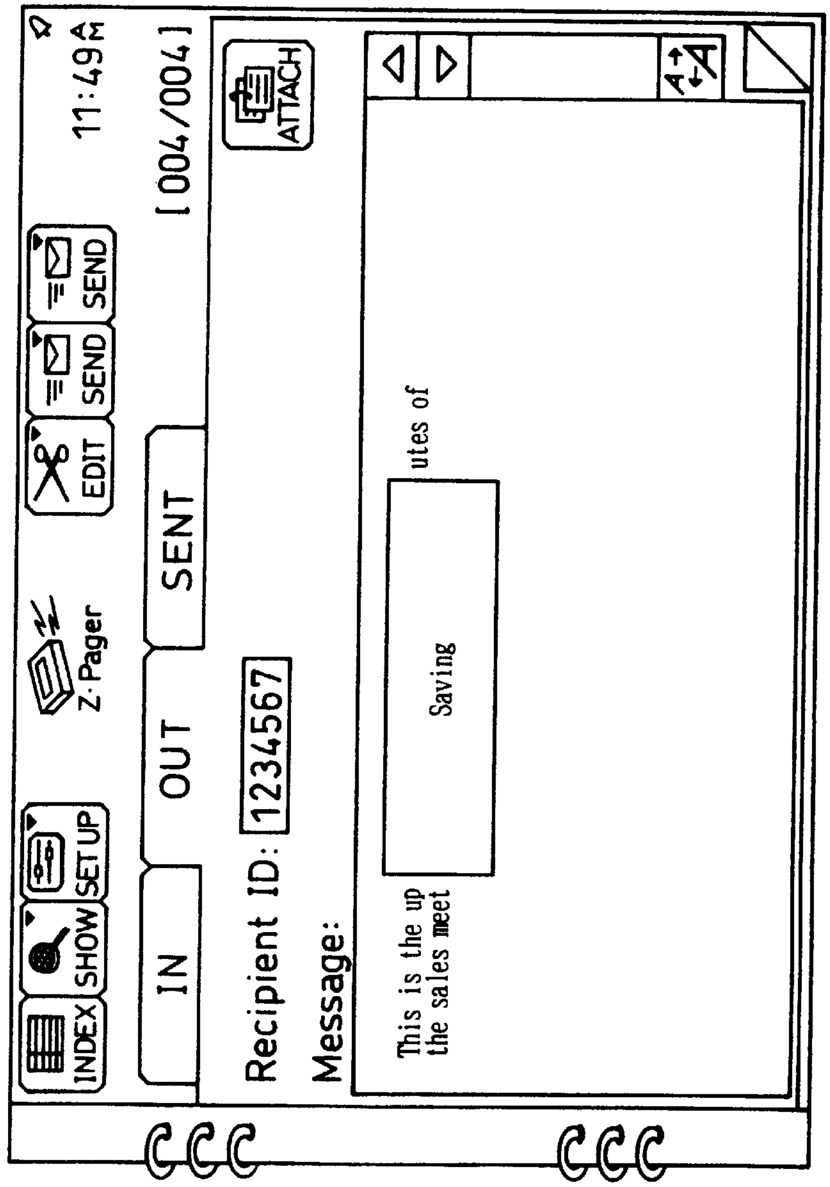
Figure 11A:
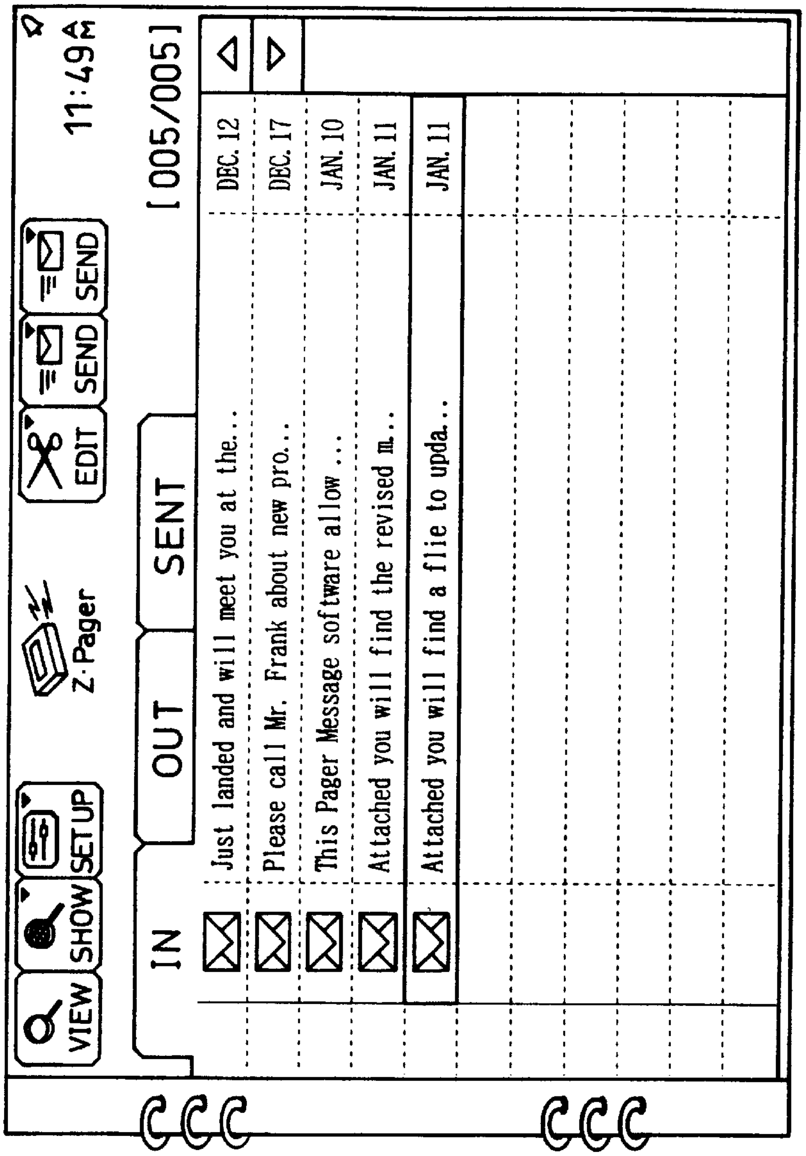
FIGS. 11(*a*) through 11(*e*) are explanatory views showing screen displaying examples, relating to verification processing of the received message and updating processing of the file, of respective steps.
Figure 11B:
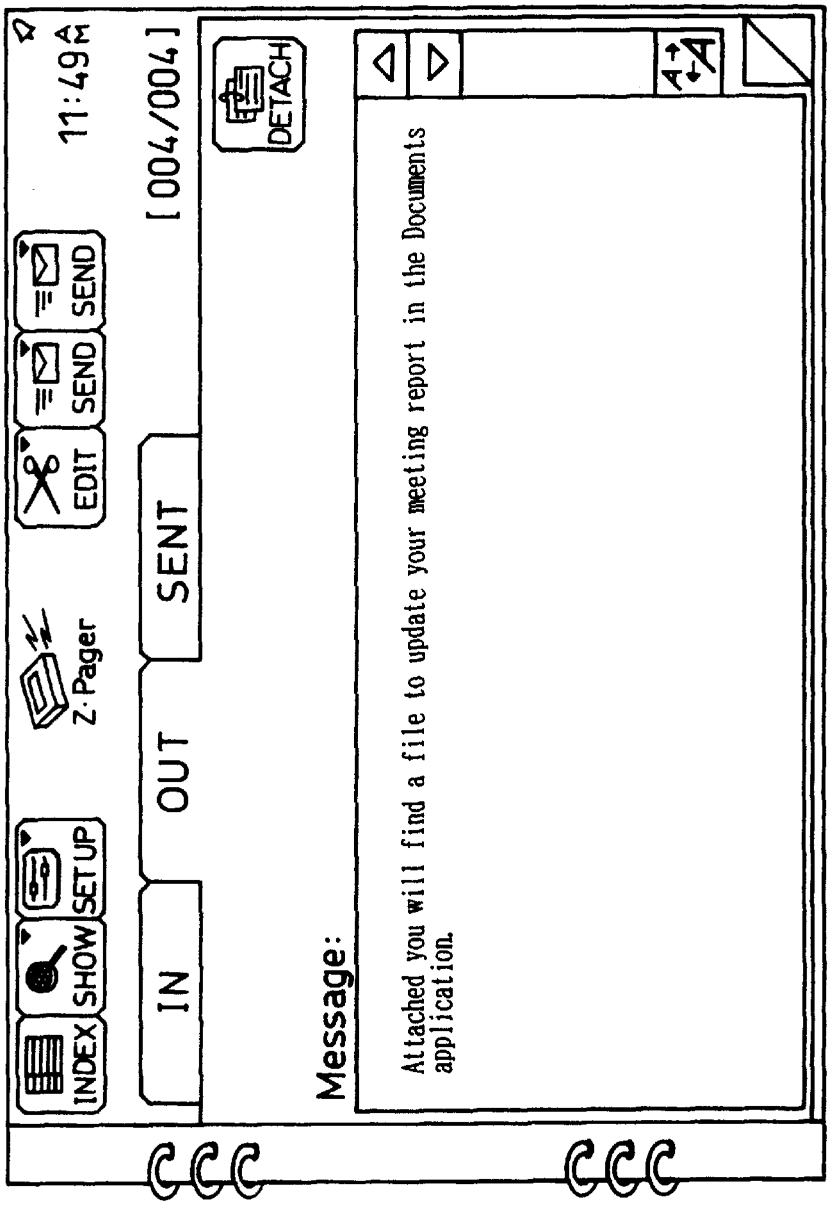
Figure 11C:
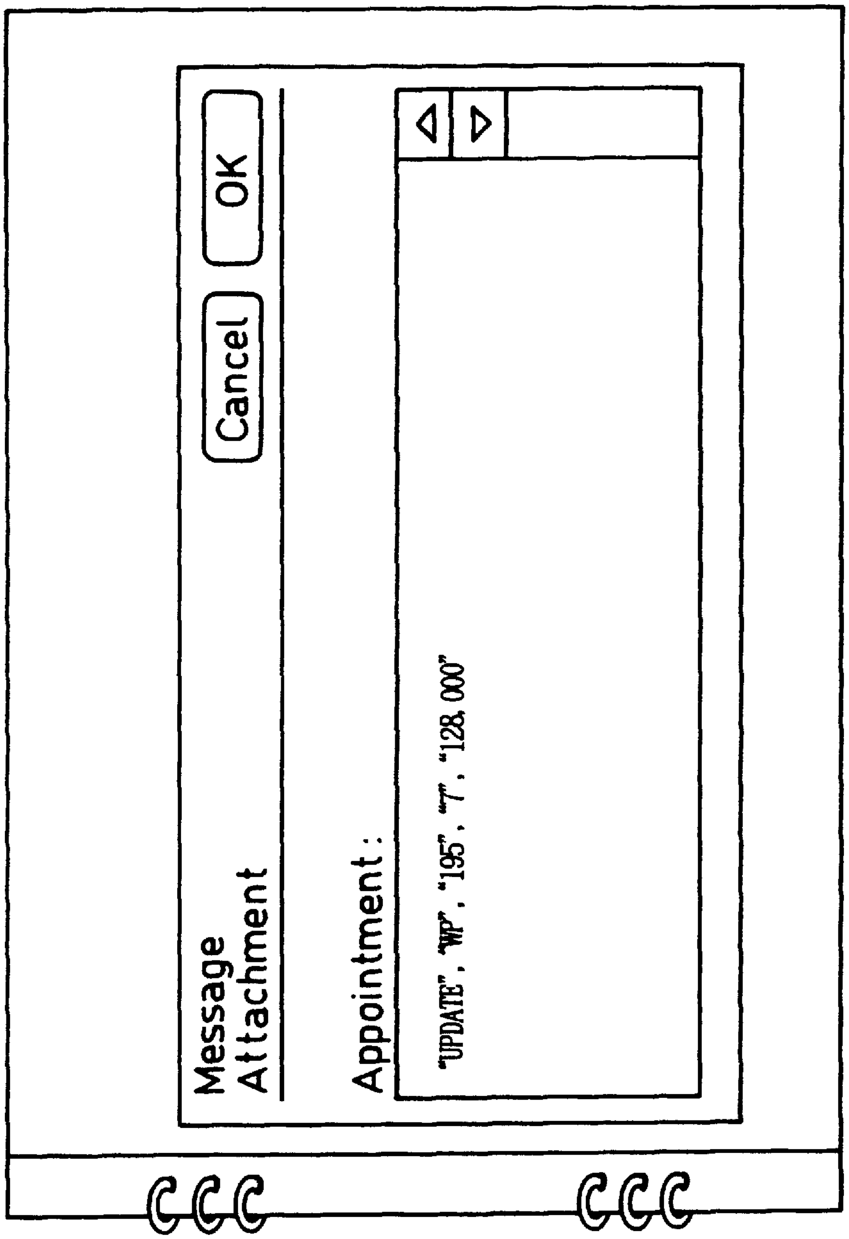
Figure 11D:
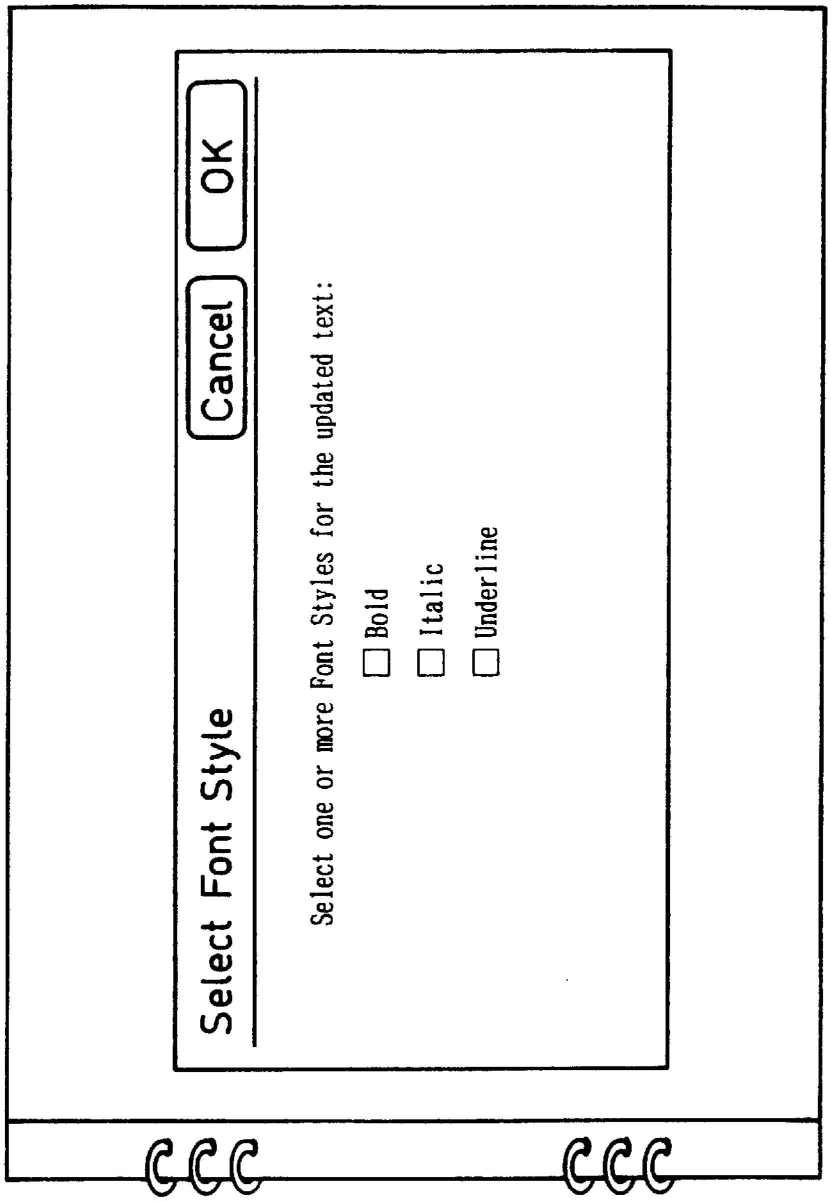
Figure 11E:
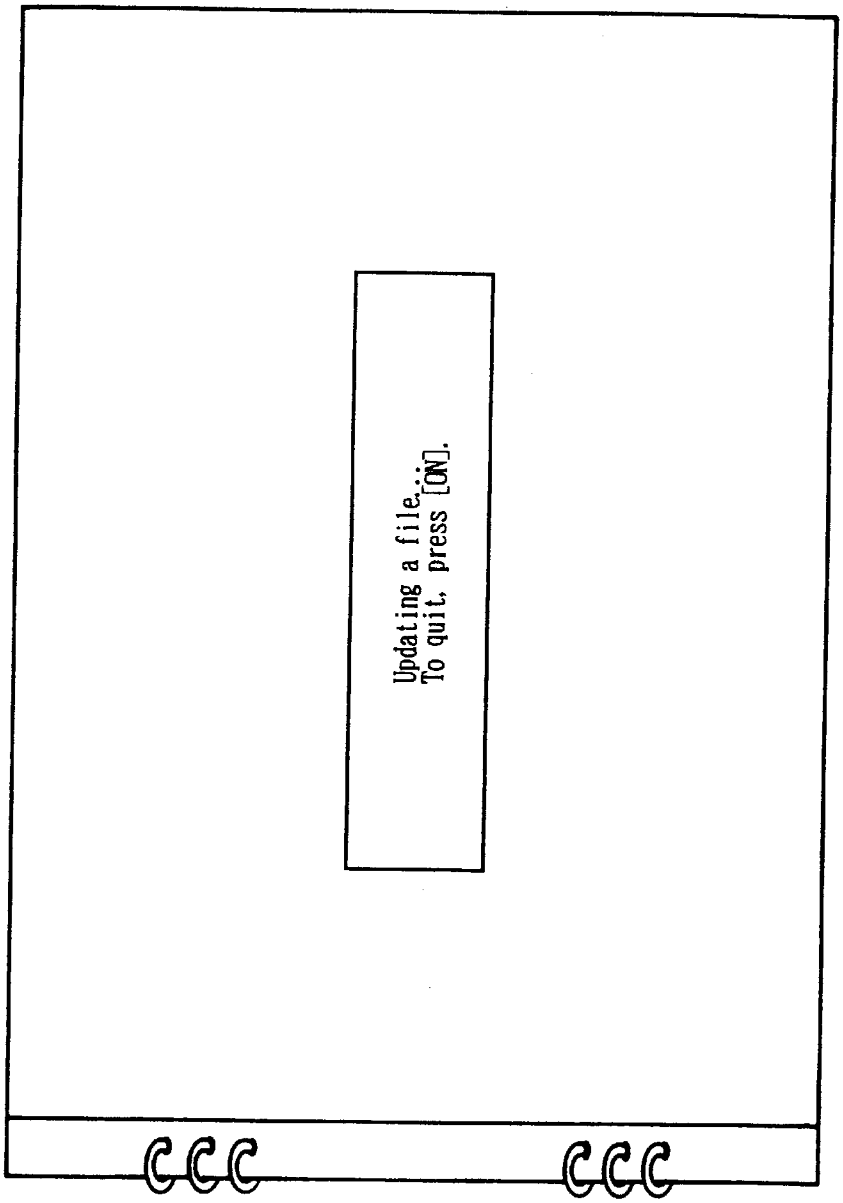
Figure 12A:
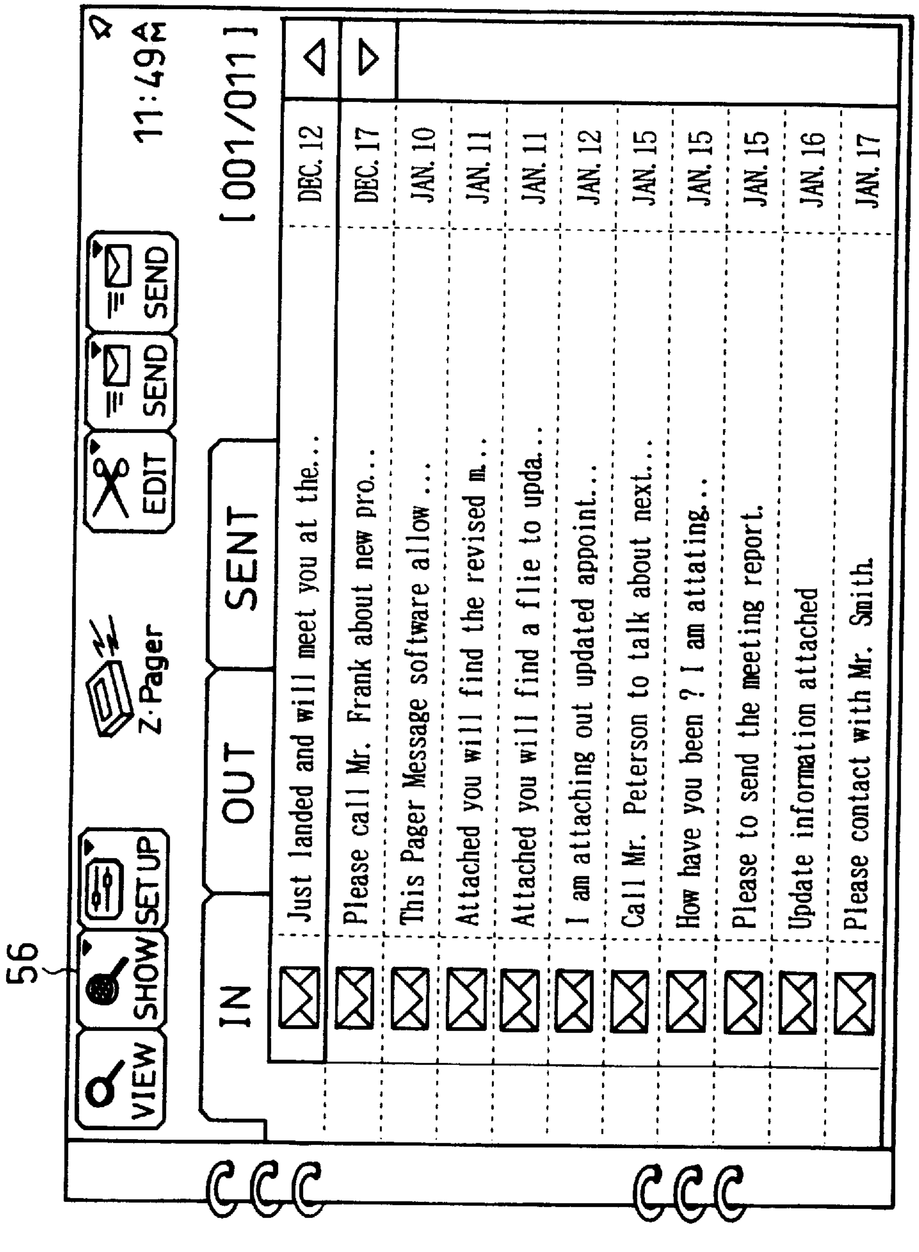
FIGS. 12(*a*) through 12(*g*) are explanatory views showing screen displaying examples, relating to processing wherein one part or the entirety of a plurality of updating information files that have been received is updated in a summarized manner, of respective steps.
Figure 12B:
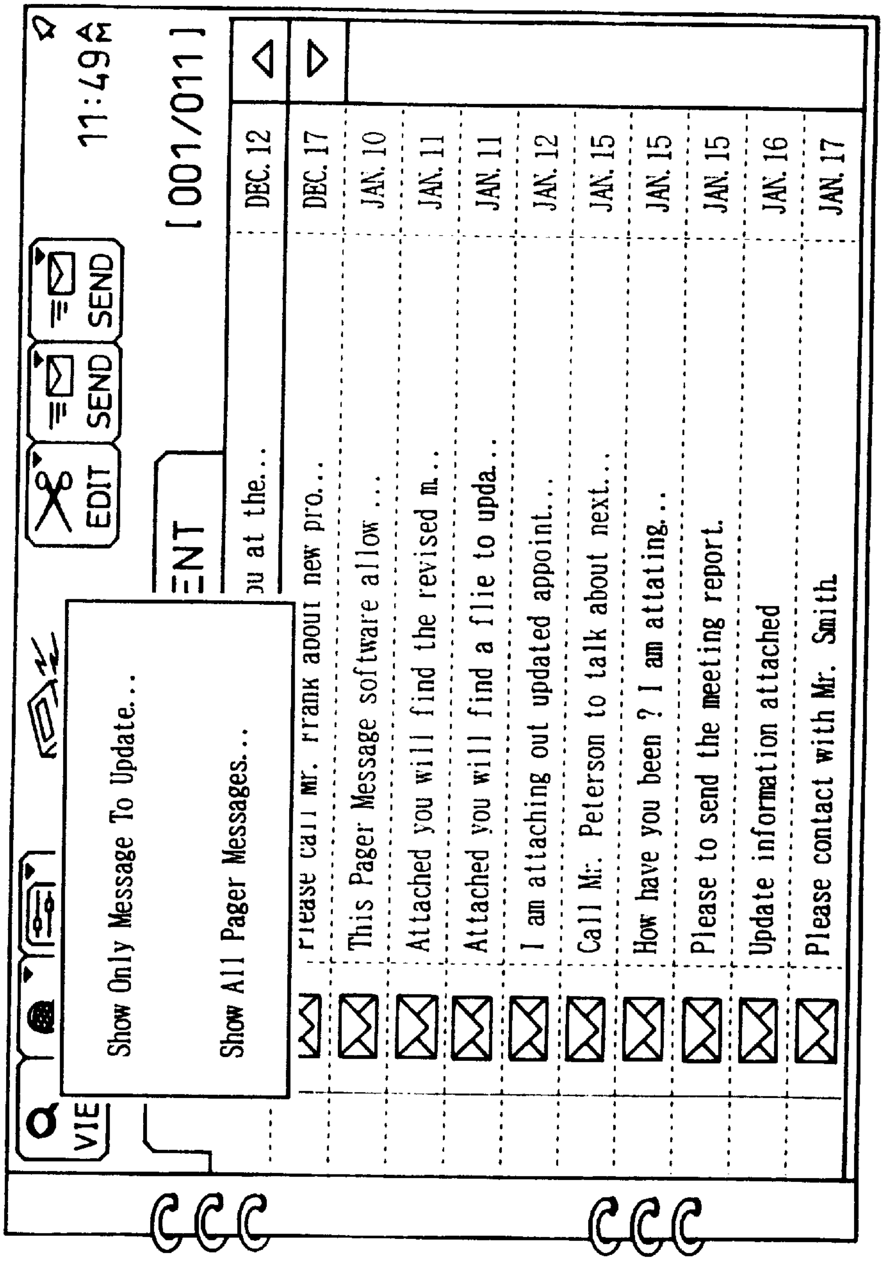
Figure 12C:
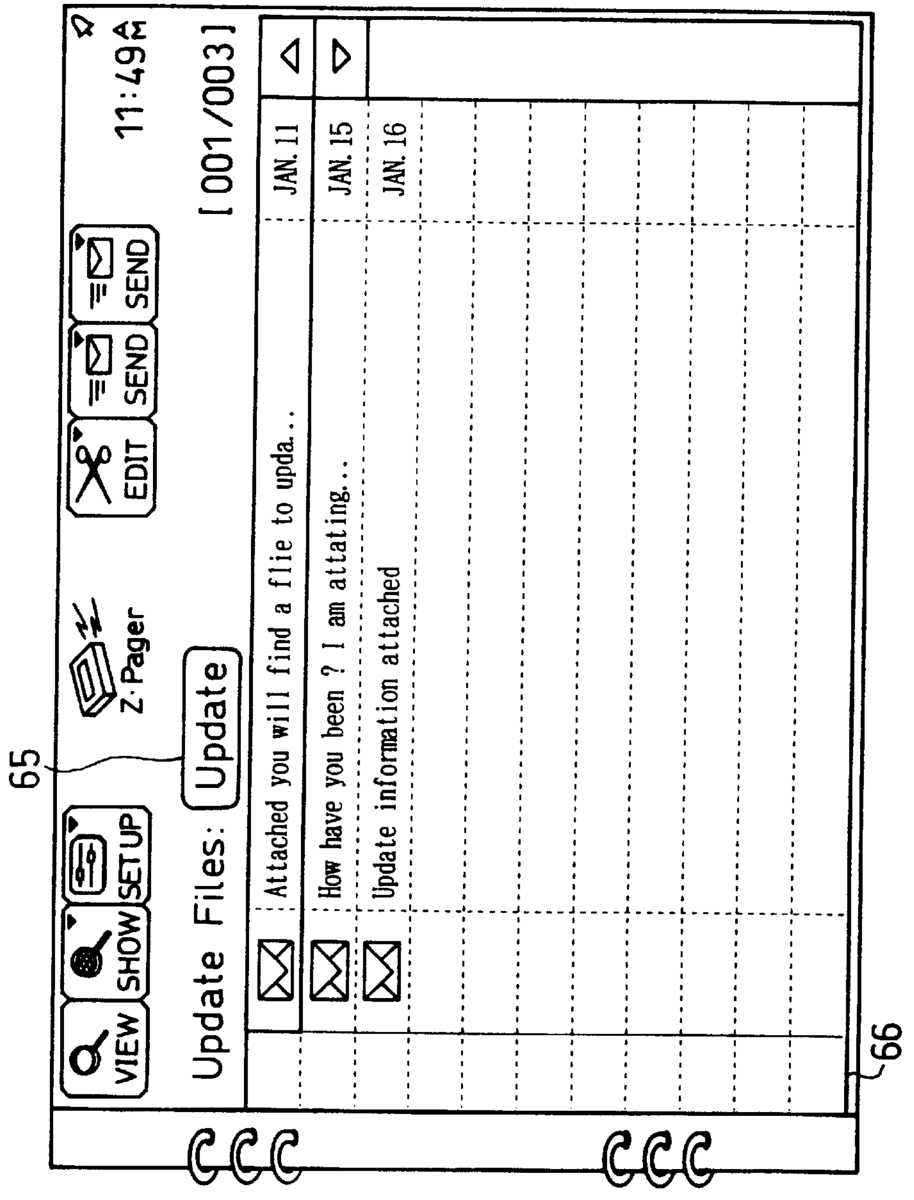
Figure 12D:
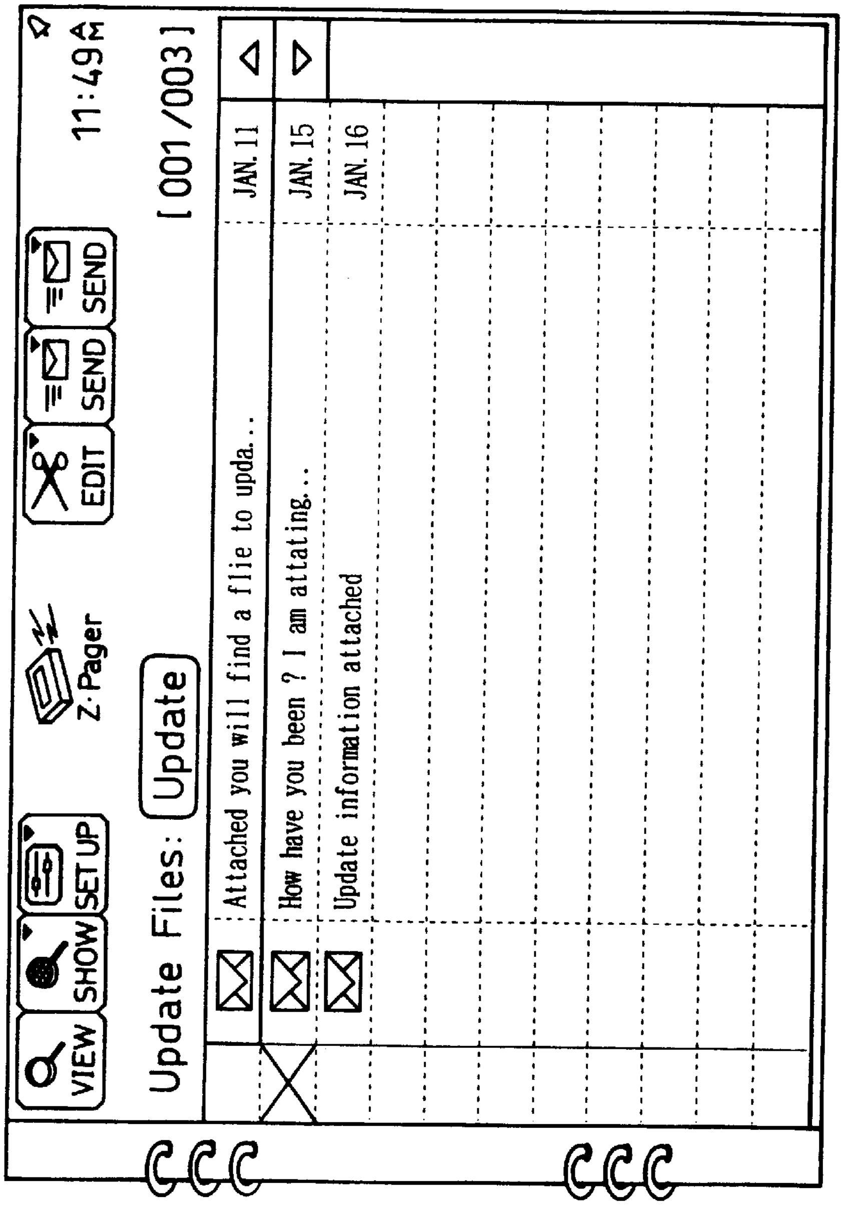
Figure 12E:
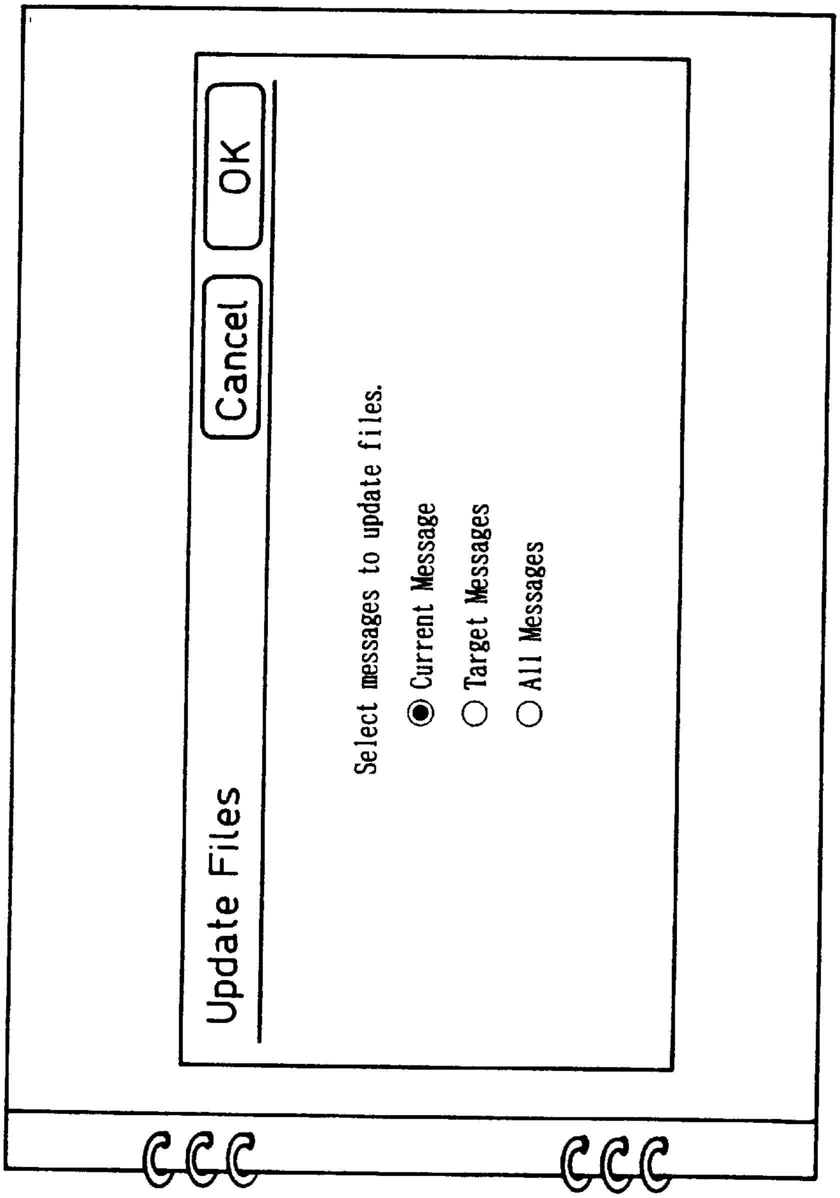
Figure 12F:
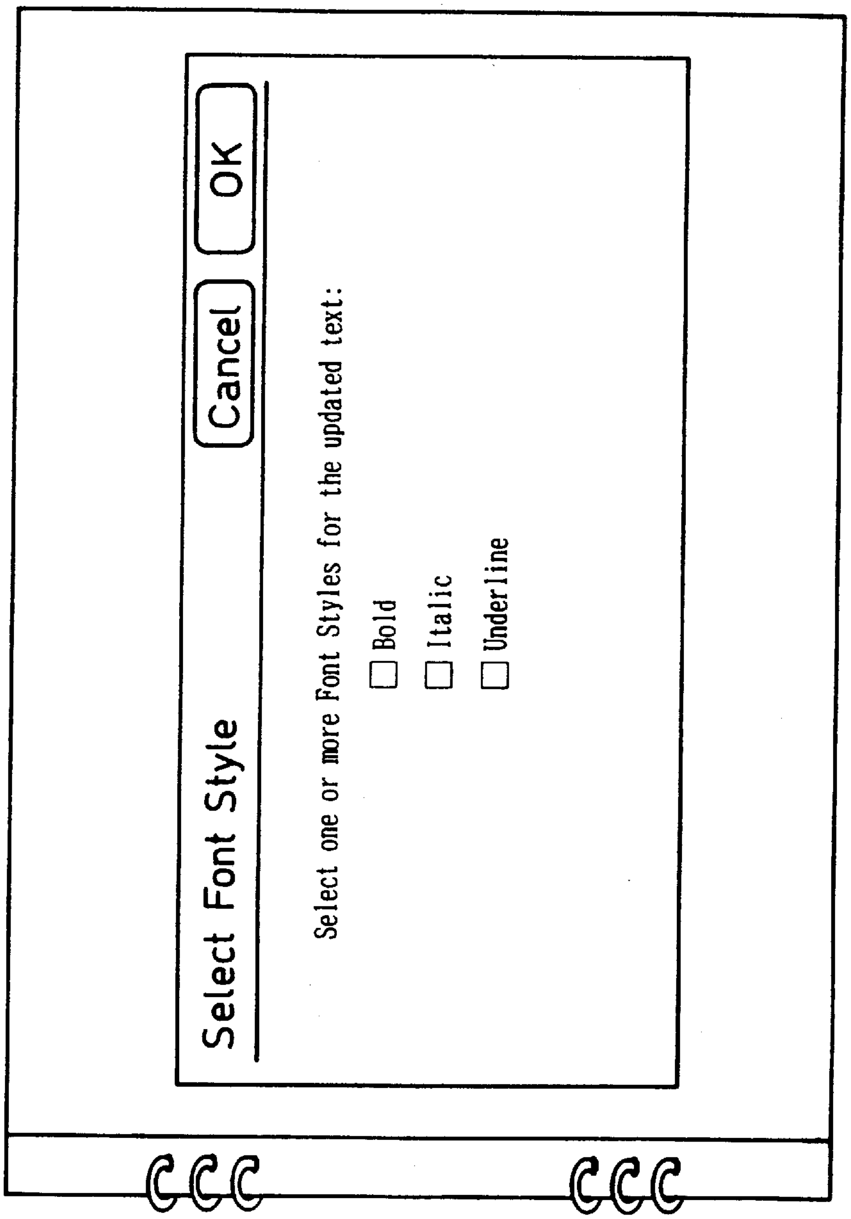
Figure 12G:
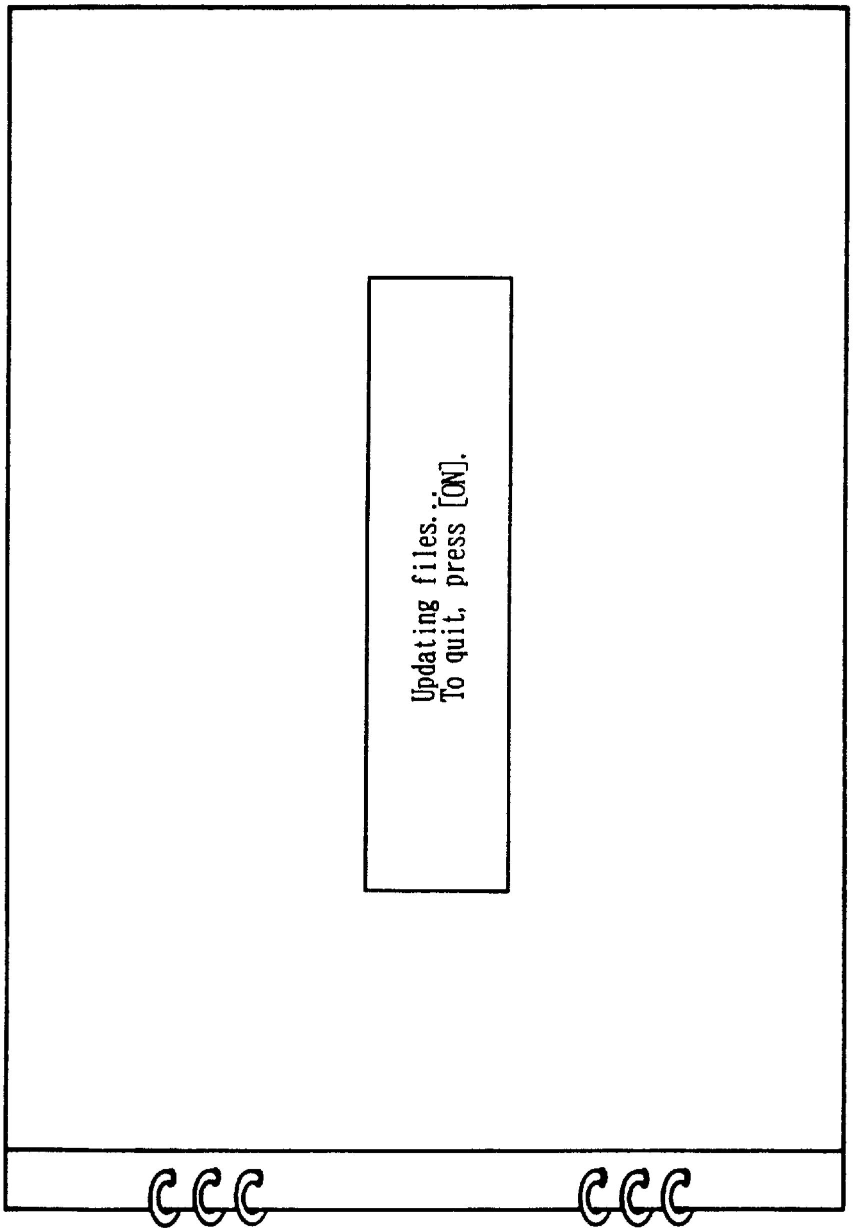

After changing the content of the file, when an "SEND" button on the screen is pressed, a menu is displayed as shown in FIG. 10(*c*). When the user selects "Make Update Information" among the menu, a screen for instructing which emphasizing font should be specified as the part to be changed is displayed (see FIG. 10(*d*)). For example, when the underline in a sentence is the content to be changed, the user specifies "Underline" and presses the "OK" button. According to the present example, since the part to be changed is specified by bold-faced type and underline, both of a check box for bold-faced type and a check box for underline should be checked. Note that the way how to specify the part that has been changed is not limited to the foregoing way, for example, the part that has been changed may be specified by a range.

When the "OK" button is pressed, the information management section 10 displays a new input screen having the pager message function (see FIG. 10(*e*)). Like the case where the message is transmitted (see FIG. 6(*a*)), on the new input screen, (1) a field 61 for inputting an identification number of an addressee and (2) a field 62 for inputting a message are displayed. Accordingly, through the screen, the user can input as an address the pager identification number of the user who shares files and can input a message as the commens. The units of the information management section 10 automatically converts the changed part prepared by the wordprocessor function and adds it as the message information upon displaying of the new input screen.

The added message information is described later. When the "Attach" button 63 is pressed, as shown in FIG. 10(*f*), the content of the updated file thus added can be verified. After inputting the address and comments, when the register key 45 is pressed, the data that is now being inputted are stored in the RAM 13 (see FIG. 10(*g*)). The data to be transmitted that has been stored in the RAM 13 is automatically stored in the OUT folder 51 as has been mentioned before.

In such a case, when the number of characters of the part that has been changed in the wordprocessor document is more than the number of characters that can be transmitted as the pager message, the unit divides the content of the part that has been changed into unit transmissible as the pager message, prepares a plurality of updating information messages, and thereafter transmits them successively.

Figure 13:
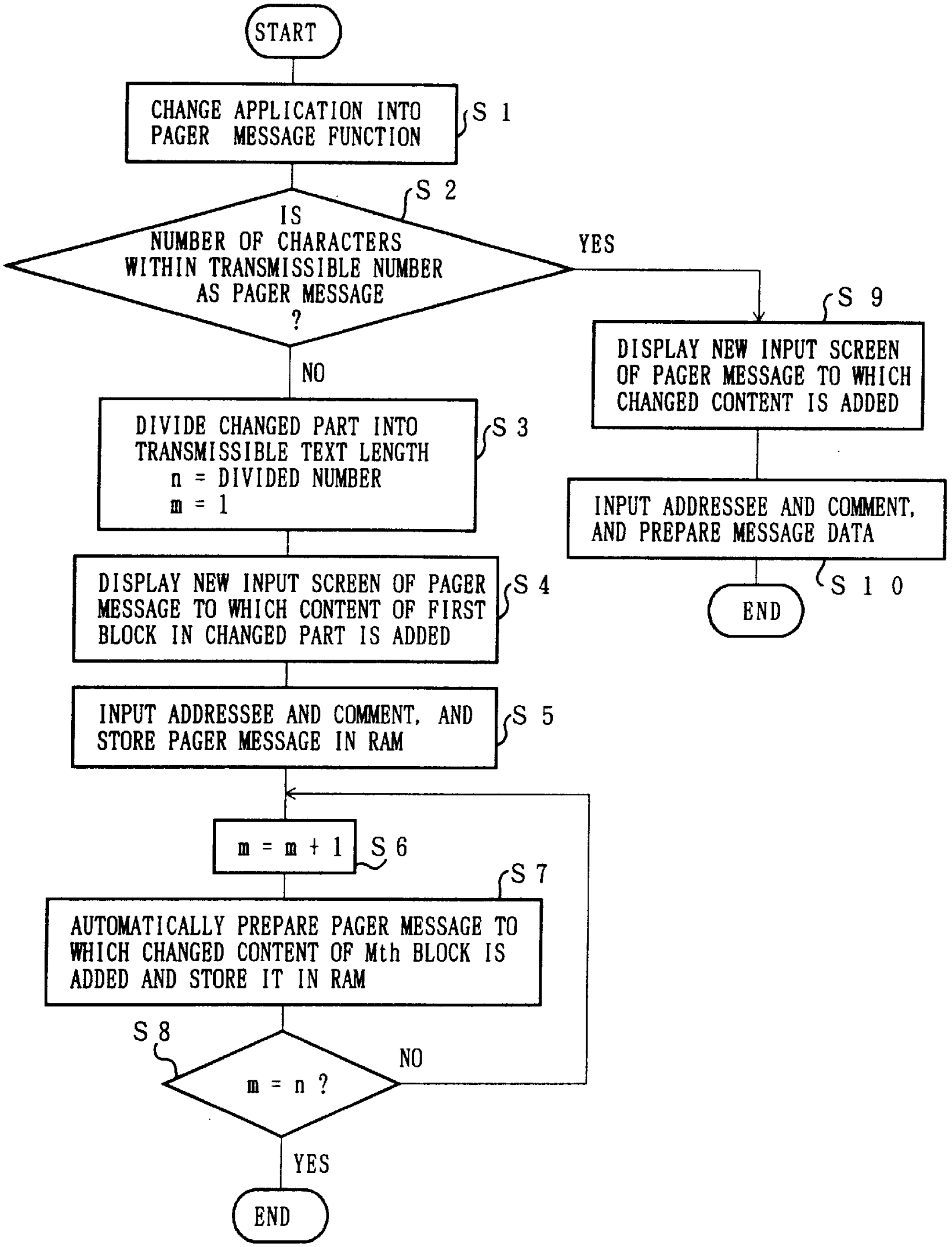
FIG. 13 is a flow chart showing the processing of a case where the number of changed characters is more than the number of characters that can be transmitted as a pager message.

Such a flow of the procedure is shown in FIG. 13. In step S1, the application is changed to the pager message function. In step S2, the number of characters of the part that has been changed is counted, and it is judged whether the counted number is within the number that can be transmitted as the pager message at a time. If so, the new input screen, of the pager message, to which the part that has been changed is added is displayed (S9), and the identification number of the addressee as well as the comments are added (S10). Thereafter, the updating information message is prepared. The updating information message is afterword transmitted like the ordinary message.

In contrast, if the counted number is not within the number that can be transmitted as the pager message at a time, the information management section 10 in step S3 divides the part that has been changed into n blocks that have a transmissible length of characters as the pager message. For example, in the case of a pager widely used in the United States of America, 80 characters or 240 characters can be transmitted in one message. Note that the numbers 1 through n are assigned to the respective blocks. In the steps S4 through S8, the updating information messages are successively prepared from the block 1 to the block n. Thus, totally n updating information messages are prepared. These updating information messages are stored in the RAM 13, and thereafter are transmitted respectively.

Meanwhile, when there are a plurality of parts that have been changed in the revised wordprocessor document, after the first updating information message is prepared in the step shown in FIG. 10(*g*), the units of the information management section 10 displays a new input screen so that respective updating information messages are successively prepared with respect to other parts that have been changed. Thus, the steps shown in FIGS. 10(*e*) through 10(*g*) are repeated for each part to be changed, and the parts that have been changed are separately registered as the respective updating information messages.

Figure 8A:
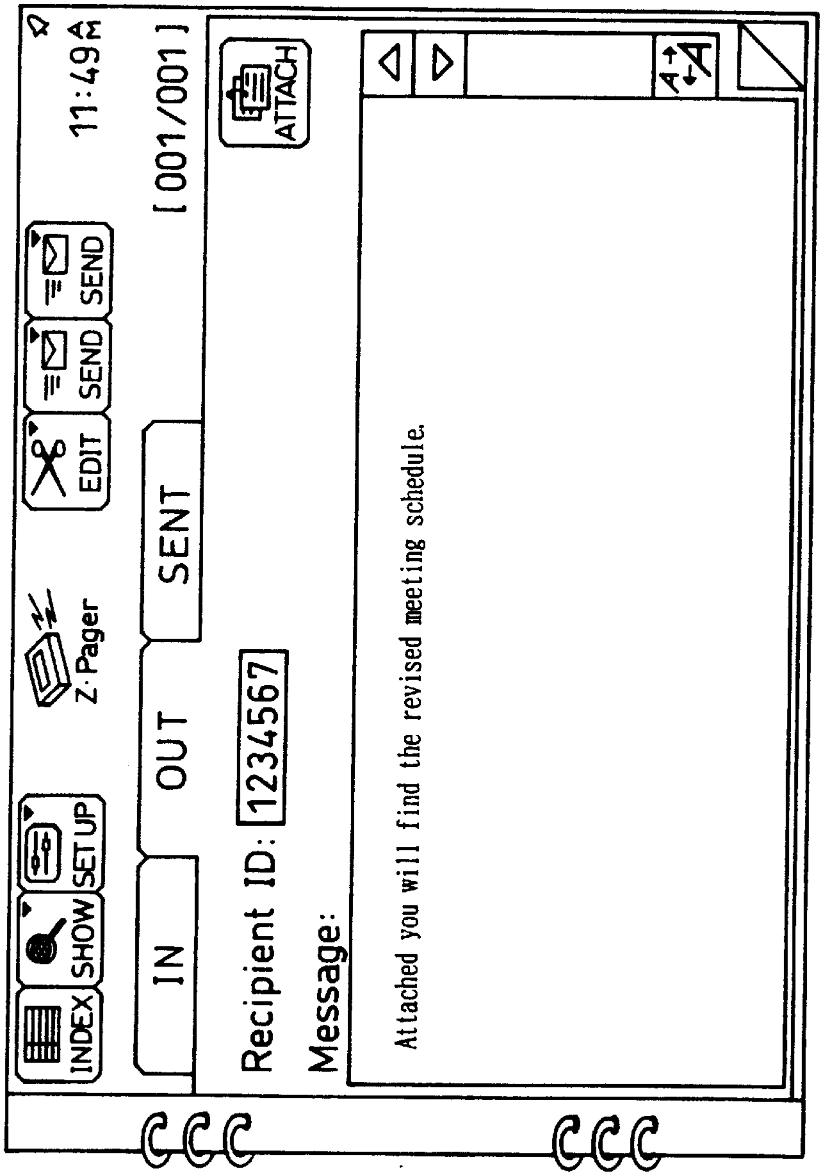
FIGS. 8(*a*) through 8(*c*) are explanatory views showing screen displaying examples, relating to the trasmitting processing of the message, of respective steps.
Figure 8B:
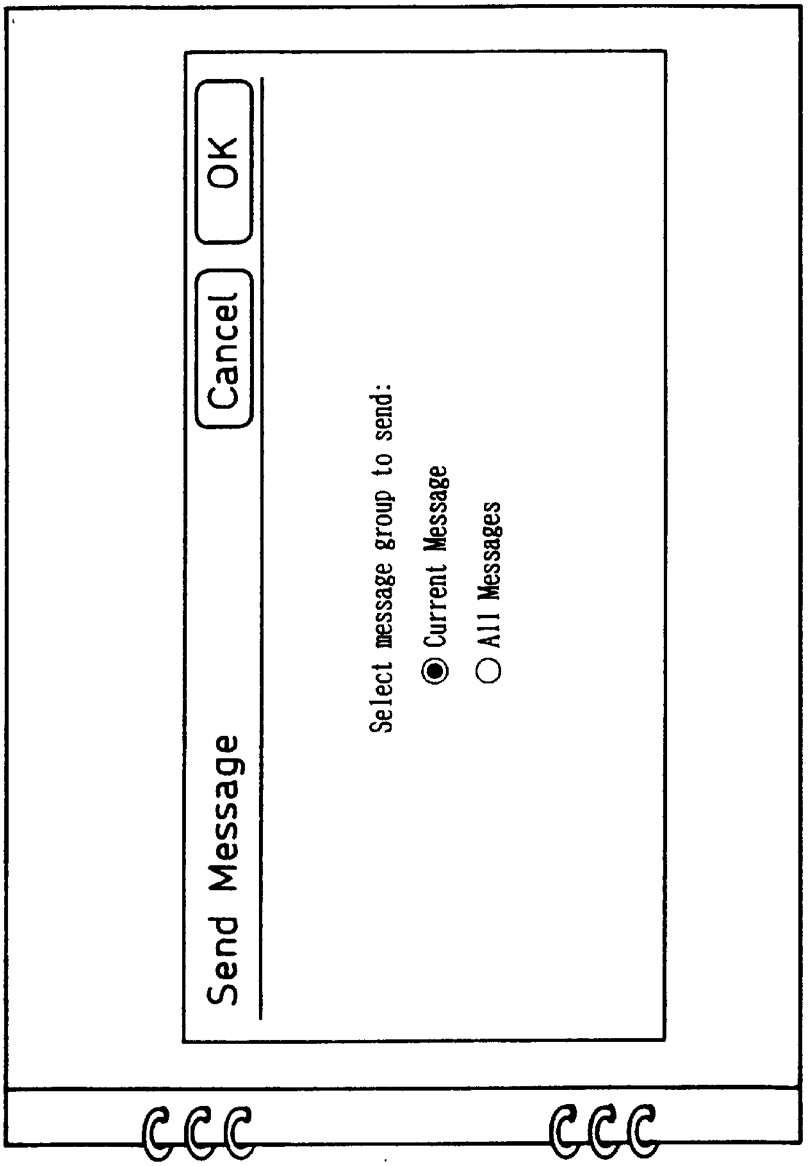
Figure 8C:
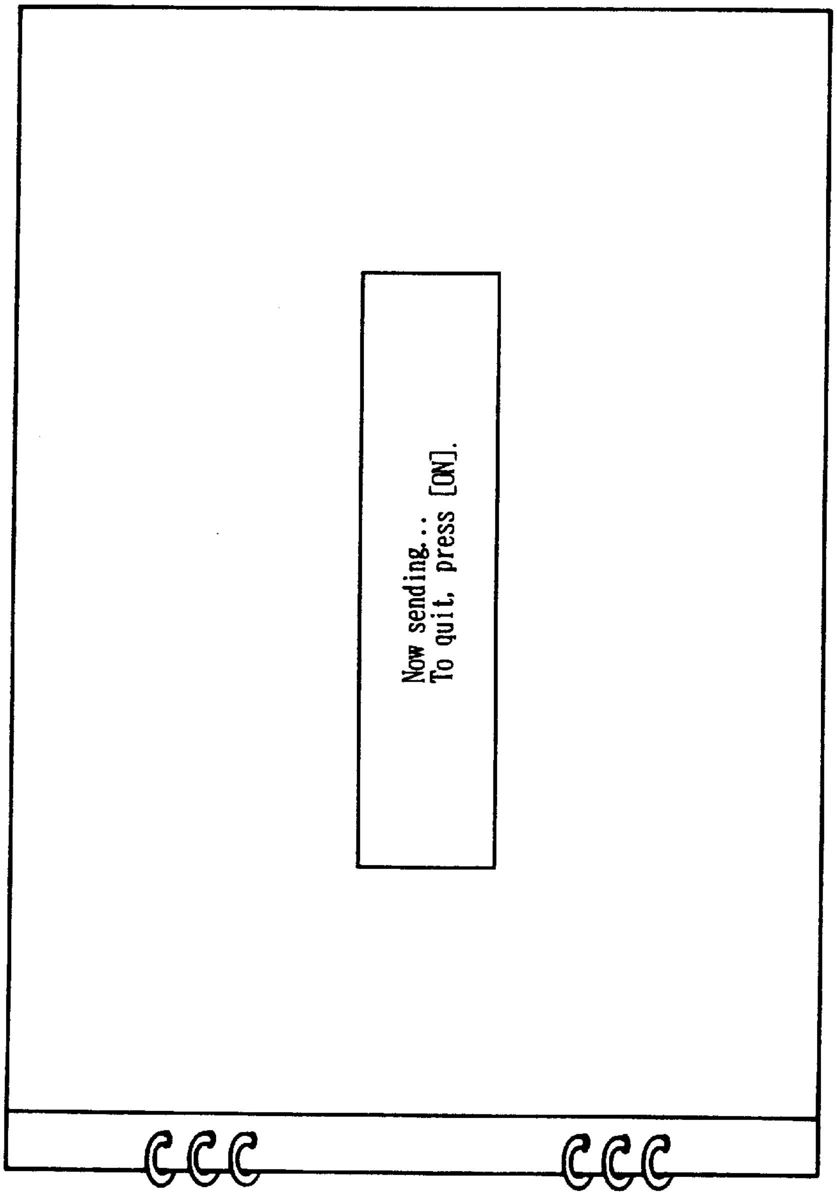

The updating information messages stored in the RAM 13 is transmissible to other portable stations as the pager message by pressing the "SEND" button displayed on the screen. The concrete procedure for transmitting a message are indicated in FIGS. 8(*a*) through 8(*c*). More specifically, the addresser can select whether one displayed message should be transmitted or all the messages should be summarized and transmitted.

The following description deals with the format of the updating information message with reference to FIG. 7(*c*). Like the case of FIGS. 10(*a*) through 10(*g*), the example of the format of the file information added as the parts that have been changed by the wordprocessor function is described here.

The updating information message is different in the part corresponding to the file information, compared to the foregoing message of the newly added file. More specifically, as shown in FIG. 7(*c*), a series of characters "UPDATE" indicating that the following content is the file updating information are added as a head end field 91. A series of characters "wP" indicative of data prepared by the wordprocessor function are added to the "UPDATE" as a field 92 indicative of the application. The "WP" is followed by a field 93, a field 94, a field 95, and a field 96 in this order. The field 93 indicates a file name of wordprocessor data, i.e., a file name to be updated. The field 94 indicates a starting position of the part to be changed, i.e., from which character the replacement should be carried out. The field 95 indicates the number of characters to be changed. The field 96 indicates which characters should be replaced in concrete. The respective contents are expressed by the CSV method. Namely, each content of the fields constituting a file is indicated by double quotation (" "), and comma (,) is added between the fields as the separator.

Accordingly, the data prepared by the pager message function for communicating by file unit has the same structure as that for updating of a file. Therefore, it is possible to transmit and receive the data under the condition where the two kind of data are freely mixed.

The foregoing description is made by use of the wordprocessor function. However, for example, in the file information format shown in FIG. 7(*c*), when (1) a series of characters "SP" are set to the field 92 indicative of the application, (2) the row number of a cell to be changed is replaced with the field 94 indicative of starting position of the part to be changed, and (3) the column number of a cell to be changed is replaced with the field 95 indicative of the number of characters to be changed, it is adaptable to the updating of file prepared by the table calculation function. Accordingly, the foregoing description is not limited to the wordprocessor function.

As shown in FIG. 3, the updating information message that has been transmitted to the radio basic station 2 is radio-transmitted from the radio basic station 2 to the portable station 3. The portable station 3 proceeds to receive the message in the manner mentioned above.

Figure 14:
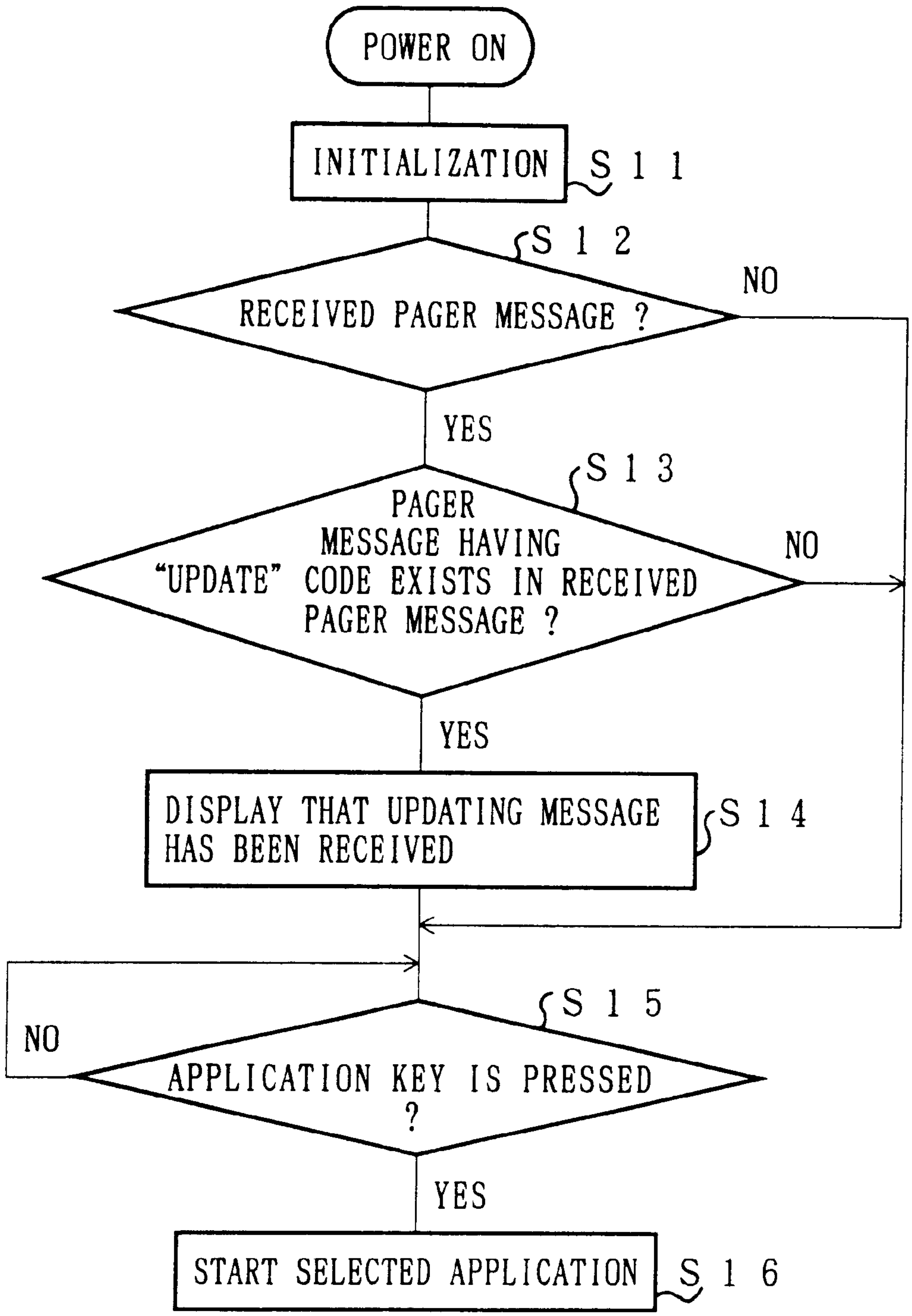
FIG. 14 is a flow chart showing how to inform a user of the fact that some changes have been made to a file.

When the updating information message is registered in the units of the information management section 10, it is possible to inform the user that the updating has been carried out with respect to some file when the updating information message is received or when the turning ON is carried out with respect to the units. Such procedure is shown in FIG. 14.

In step S11, the device is initialized. In step S12, when it is judged that a pager message has been received, it is judged in step S13 whether or not the pager message is a updating information message. More specifically, like the case of the newly added file, it is verified that a predetermined data header 71 exists in the message and that the numerical value of the file length 73 is not zero. By such verification, it can be judged that the file information 74 is added to the message. It is further judged whether or not the first field of the file information 74 is a predetermined series of characters "UPDATE". If it is judged that the first field is "UPDATE", it is displayed in step S14 that the updating message has been received. If the field is a series of characters "ADDMSG" indicative of a newly added file, the information management section 10 judges that the message is a newly added file.

Then, in step S15, it is judged whether or not an application key is pressed. If pressed, the selected application starts (step S16).

The message that the units of the information management section 10 has received and the RAM 13 has stored is stored in the IN folder 53. Accordingly, when selecting the IN folder 53 by use of the pager message function, the user can verify the received messages in a list-displayed manner (see FIG. 11(*a*)). By selecting from the list the message which the user wishes to view its detail content and pressing a "VIEW" button 55, it is possible to view the content of the received message in detail (see FIG. 11(*b*)). When the received data has a series of characters "Z-PAGER" at the head end, the received message is the data prepared by the pager message function. Accordingly, the information management section 10 picks up the part corresponding to the message information 72 in the received message, and displays it on the screen for one message displaying. More specifically, as shown in FIG. 7(*a*), in the message data, the part starting from "Msg:" and ending to 7Ch are dealt with as the message information 72.

In contrast, when there are not a series of characters "Z-PAGER" at the head end of the data, the information management section 10 judges that the received message is not the data prepared by the pager message function. In this case, the content of the message is displayed as it is on the screen for one message displaying.

The fact that the received message is the data prepared by the pager message function and the numerical value of the file length 73 in the data is not zero indicates that the file information is added to the message. In such a case, the "Detach" button 64 is displayed on the screen for one message displaying. When the "Detach" button 64 is pressed, the content of the file information 74 is displayed as shown in FIG. 11(*c*).

The foregoing steps are the same as the case, shown in FIGS. 9(*a*) through 9(*c*), where the communication is carried out by file unit in the form of message. When there are a series of characters "UPDATE" in the file information 74 of the displayed message, the following steps should be carried out because the the file added to the message is updating information. Thus, these steps are different from the case where the communication is carried out by file unit in the form of message.

More specifically, when the "OK" button on the screen is pressed in FIG. 11(*c*), the information management section 10 displays a screen for specifying which kind of emphasizing fonts should be used with respect to the part to be changed during updating of a file. When the user does not need to know which part should be changed in a file, it is not necessary to specify such fonts. In contrast, when the user wishes to make underline to the part to be changed in the file and verify afterword such underlined part, the user should select and touch the check box for underline. After carrying out a target processing among the foregoing ones, when the "OK" button on the screen is pressed, the information management section 10 updates a file in the specified application in a manner reverse to the procedure wherein the updating information of the file is prepared (see FIG. 11(*e*)).

The following description deals with the procedure for updating of a file by use of a list-displaying of the pager message with reference to FIGS. 12(*a*) through 12(*g*). For example, when a list-displaying is instructed by pressing the "INDEX" button 54 shown in FIG. 4(*a*), the information management section 10, as shown in FIG. 12(*a*), list-displays the received messages stored in the IN folder 53. When an "SHOW" button 56 on the same screen is pressed, a menu is displayed as shown in FIG. 12(*b*). When selecting "Show Only Messages To Update" in the menu, as shown in FIG. 12(*c*), only the updating information messages that have a series of characters "UPDATE" in the file information are list-displayed. In this case, a "Update" button 65 is displayed on the screen. Check boxes 66 are displayed at the left end of respective messages on the list-displaying screen. The user can check by touching the check box as shown in FIG. 12(*d*). It is possible to invalidate the checking of the checked boxes 66 by touching again the checked boxes 66.

If the user wishes to carry out updating of a file by use of only a specified message in the list, it is required to check the check boxes of the specified messages by touching operation. In contrast, if the user wishes to carry out updating of a file by use of only a currently selected message or by use of all the updating information messages that have been list-displayed, it is not required to check any check boxes.

After carrying out the target procedure among the foregoing ones, when the "Update" button 65 is pressed, the information management section 10, as shown in FIG. 12(*e*), displays a screen for verifying that the updating of the file should be carried out with respect to (1) only one selected message, (2) only the messages specified by the check boxes, or (3) all the messages that has been list-displayed.

When the "OK" button is pressed after selecting one of the foregoing (1) through (3), the information management section 10, as shown in FIG. 12(*f*), displays a screen for specifying which kind of fonts should be used with respect to the part to be changed during updating of a file. The content of such specifying is the same as that shown in FIG. 11(*d*). When the "OK" button is pressed after specifying some font, the information management section 10 updates a file in the specified application in a manner reverse to the procedure wherein the updating information of the file is prepared (see FIG. 12(*g*)).

According to the foregoing procedure, the updating of files associated with the portable station 3 can be carried out with high efficiency and in a shorter time through the form of message while the conventional pager system is used as it is.

The radio data communication system in accordance with the present embodiment, which includes a base station for transmitting radio data in a form of message and portable stations that receive the radio data from the base station and has a plurality of processing modes so as to store information in memory means in accordance with the processing modes, is characterized in that (1) the base station converts a file corresponding to each processing mode of the portable stations into a form of message in accordance with a predetermined rule so as to radio-transmit the converted file, and (2) the portable station receives the data of message form transmitted from the base station, converts it into a file structure corresponding to each processing mode, and stores it into the memory means, whereby the files are transmitted and received through data in a form of message.

With the arrangement, an addresser transmits to a radio base station a file having a data structure, of a portable information device, which is converted into a form of message in accordance with a predetermined specified rule. Namely, if an addressee knows only the predetermined specified rule, the received message can be converted into the file having the data structure of the portable information device. As a result, it is possible to transmit and receive file/data in accordance with an application of a specific device by use of a conventional pager system. Further, since the conventional pager system can be used as it is, it is possible to realize a system that can transmit and receive the above-mentioned file data more easily than the case where the code sets of the pager system are changed.

In addition to the foregoing arrangement, it is preferable that (1) the base station converts a part corresponding to the part that has been changed into a updating data in a form of message in response to a change in a file and (2) the portable station converts a received updating data in accordance with a predetermined converting rule so as to automatically update the changed part of the file in the memory means.

With the arrangement, when a file has been changed, only the part that has been changed in the file is converted into a form of message in accordance with the predetermined rule which is specified by the addresser and addressee. As a result, the time required for updating of information by use of the radio data communication becomes shorter than the case where all the files are transmitted.

It is preferable in addition to the foregoing arrangement that the radio data communication system displays a updated part of a updated file in a form of displaying that is different from other parts so as to inform the user of the updated part. With the arrangement, the user can recognize which part of the updated file has been updated with ease when the user receives the updated file.

It is more preferable in addition to the foregoing arrangement that, when transmitting and receiving of the updated data, the data in a form of message that has been received from the base station is list-displayed so as to confirm the user whether or not a file for each data should be updated so as to update each data. With the arrangement, when updating a plurality of files to the respective latest ones, it is possible to select a file that the user wishes to update. Accordingly, it is possible to update a file that the user really wishes to update. Accordingly, even when it is not possible to update all the files at a time due to the fact that there is no vacant area on the side of the addressee, it is possible to update only necessary files without causing any problems.

There are described above novel features which the skilled man will appreciate give rise to advantages. These are each independent aspects of the invention to be covered by the present application, irrespective of whether or not they are included wihtin the scope of the following claims.

What is claimed is:

1. A radio data communication method for radio-transmitting a file from a transmitting device to portable terminals, the portable terminals having memory means for storing a file, said method comprising the steps of:

(a) converting, in the transmitting device, a file including data other than data in a previously determined specific code set into message data in a message format made up of data in the specific code set;

(b) radio-transmitting the message data from the transmitting device; and (c) carrying out reverse-conversion in a portable terminal by preparing, based on the received message data in message format, a file equivalent to the file in the transmitting device, and storing the file in the memory means, wherein, in the step (a), the file is converted into updating data that is message data indicative of a part that has been changed and content how the part has been changed, and in the step (c), the part, of the file stored in, the memory means, that is to be changed is updated in accordance with the updating data, further comprising the step of displaying the changed part of the updated file in a form of display that is different from others that have not changed.

2. The radio data communication method as set forth in claim 1, wherein the message data includes specific data indicative of message data which was created by conversion of the file in the form of message in said step (a).

3. The radio data communication method as set forth in claim 1, wherein the memory means stores plural kinds of files that have different data structures with each other, the message data includes mode data specifying that the message data should be converted into a file having a specific data structure among the data structures, and a file is prepared, in the step (c), in accordance with the specific data structure specified by the mode data.

4. The radio data communication method as set forth in claim 1, wherein the step (a) includes the step of:

(d) dividing the converted message data into a plurality of message data, when a length of the converted message data is greater than a predetermined maximum length, so that each length of the divided plurality of message data falls within the predetermined maximum length, wherein one file is prepared, in the step (c), from the divided plurality of message data.

5. The radio data communication method as set forth in claim 4, wherein the step (d) includes the step of:

(e) providing a divided message data with a number N indicating that the divided message data is Nth in order among the divided plurality of message data.

6. The radio data communication method as set forth in claim 1, wherein the updating data includes predetermined identification data for identifying whether or not the message data is updating data.

7. The radio data communication method as set forth in claim 1, wherein the step (a) includes the step of:

(f) dividing the converted updating data into a plurality of updating data, when a length of the converted updating data is greater than a predetermined maximum length, so that each length of the divided plurality of updating data falls within the predetermined maximum length, wherein one file is prepared, in the step (c), from the divided plurality of updating data.

8. The radio data communication method as set forth in claim 7, wherein the step (f) includes:

(g) providing a divided message data with a number N indicating that the divided message data is Nth in order among the divided plurality of message data.

9. A recording medium for storing programs that is used for carrying out the radio data communication method as set forth in claim 1.

10. A radio data communication method for radio-transmitting a file from a transmitting device to portable terminals, the portable terminals having memory means for storing a file, said method comprising the step of:

(a) converting, in the transmitting device, a file including data other than data in a previously determined specific code set into message data in a message format made up of data in the specific code set;

(b) radio-transmitting the message data from the transmitting device; and (c) carrying out reverse-conversion in a portable terminal by preparing, based on the received message data in message format, a file equivalent to the file in the transmitting device, and storing the file in the memory means, wherein, in the step (a), the file is converted into updating data that is message data indicative of a part that has been changed and content how the part has been changed, and in the step (c), the part, of the file stored in the memory means, that is to be changed is updated in accordance with the updating data, wherein the step (c) includes the step of:

selecting updating data used during updating among the received updating data.

11. The radio data communication method as set forth in claim 10, wherein the message data includes specific data indicative of message data which was created by conversion of the file in the form of message in said step (a).

12. The radio data communication method as set forth in claim 10, wherein the memory means stores plural kinds of files that have different data structures with each other, the message data includes mode data specifying that the message data should be converted into a file having a specific data structure among the data structures, and a file is prepared, in the step (c), in accordance with the specific data structure specified by the mode data.

13. The radio data communication method as set forth in claim 10, wherein the step (a) includes the step of:

(d) dividing the converted message data into a plurality of message data, when a length of the converted message data is greater than a predetermined maximum length, so that each length of the divided plurality of message data falls within the predetermined maximum length, wherein one file is prepared, in the step (c), from the divided plurality of message data.

14. The radio data communication method as set forth in claim 13, wherein the step (d) includes the step of:

(e) providing a divided message data with a number N indicating that the divided message data is Nth in order among the divided plurality of message data.

15. The radio data communication method as set forth in claim 10, wherein the updating data includes predetermined identification data for identifying whether or not the message data is updating data.

16. The radio data communication method as set forth in claim 10, wherein the step (a) includes the step of:

(f) dividing the converted updating data into a plurality of updating data, when a length of the converted updating data is greater than a predetermined maximum length, so that each length of the divided plurality of updating data falls within the predetermined maximum length, wherein one file is prepared, in the step (c), from the divided plurality of updating data.

17. The radio data communication method as set forth in claim 16, wherein the step (f) includes:

(g) providing a divided message data with a number N indicating that the divided message data is Nth in order among the divided plurality of message data.

18. A recording medium for storing programs that is used for carrying out the radio data communication method as set forth in claim 10.

19. A radio data communication method for radio-transmitting a file from a transmitting device to portable terminals, the portable terminals having memory means for storing a file, said method comprising the steps of:

(a) converting, in the transmitting device, a file including data other than data in a previously determined specific code set into message data in a message format made up of data in the specific code set;

(b) radio-transmitting the message data from the transmitting device; and (c) carrying out reverse-conversion in a portable terminal by preparing, based on the received message data in message format, a file equivalent to the file in the transmitting device, and storing the file in the memory means, wherein, in the step (a), the file is converted into updating data that is message data indicative of a part that has been changed and content how the part has been changed, and in the step (c), the part, of the file stored in the memory means, that is to be changed is updated in accordance with the updating data, wherein the file includes display form data for discriminating, during displaying content of the file, between a first part which is displayed in a first display form and a second part which is displayed in a second display form differing from the first display form, and the step (a) includes the step of preparing, in the transmitting device, the updating data by treating the first part of the file, to be displayed in the first display form, as the part to be changed.

20. The radio data communication method as set forth in claim 19, wherein the message data includes specific data indicative of message data which was created by conversion of the file in the form of message in said step (a).

21. The radio data communication method as set forth in claim 19, wherein the memory means stores plural kinds of files that have different data structures with each other, the message data includes mode data specifying that the message data should be converted into a file having a specific data structure among the data structures, and a file is prepared, in the step (c), in accordance with the specific data structure specified by the mode data.

22. The radio data communication method as set forth in claim 19, wherein the step (a) includes the step of:

(d) dividing the converted message data into a plurality of message data, when a length of the converted message data is greater than a predetermined maximum length, so that each length of the divided plurality of message data falls within the predetermined maximum length, wherein one file is prepared, in the step (c), from the divided plurality of message data.

23. The radio data communication method as set forth in claim 22, wherein the step (d) includes the step of:

(e) providing a divided message data with a number N indicating that the divided message data is Nth in order among the divided plurality of message data.

24. The radio data communication method as set forth in claim 19, wherein the updating data includes predetermined identification data for identifying whether or not the message data is updating data.

25. The radio data communication method as set forth in claim 19, wherein the step (a) includes the step of:

(f) dividing the converted updating data into a plurality of updating data, when a length of the converted updating data is greater than a predetermined maximum length, so that each length of the divided plurality of updating data falls within the predetermined maximum length, wherein one file is prepared, in the step (c), from the divided plurality of updating data.

26. The radio data communication method as set forth in claim 25, wherein the step (f) includes:

(g) providing a divided message data with a number N indicating that the divided message data is Nth in order among the divided plurality of message data.

27. A recording medium for storing programs that is used for carrying out the radio data communication method as set forth in claim 19.

* * * * *